US006031954A

United States Patent [19]
Higuchi

[11] Patent Number: 6,031,954
[45] Date of Patent: Feb. 29, 2000

[54] OPTICAL IMAGE GUIDE SYSTEM

[75] Inventor: Masaru Higuchi, Akiruno, Japan

[73] Assignee: Casio Computer Co., Ltd., Tokyo, Japan

[21] Appl. No.: 08/811,863

[22] Filed: Mar. 4, 1997

[30] Foreign Application Priority Data

Mar. 27, 1996 [JP] Japan .................................... 8-095879

[51] Int. Cl.[7] ........................................ G02B 6/08

[52] U.S. Cl. .......................... 385/120; 385/116; 385/147; 385/901

[58] Field of Search ............................ 385/115–121, 133, 385/146, 147, 901; 348/739, 804

[56] References Cited

U.S. PATENT DOCUMENTS

| | | | |
|---|---|---|---|
| 3,728,422 | 4/1973 | Sugaya | 264/1 |
| 4,139,261 | 2/1979 | Hilsum | 385/120 |
| 4,208,096 | 6/1980 | Glenn, Jr. | 385/120 |
| 4,671,606 | 6/1987 | Yevick | 350/96.1 |
| 5,381,502 | 1/1995 | Veligdan | 385/115 |
| 5,465,315 | 11/1995 | Sakai et al. | 385/116 |
| 5,640,483 | 6/1997 | Lin | 385/146 |

FOREIGN PATENT DOCUMENTS 2-294684 12/1990 Japan .

*Primary Examiner*—John D. Lee
*Assistant Examiner*—Juliana K. Kang
*Attorney, Agent, or Firm*—Frishauf, Holtz, Goodman, Langer & Chick, P.C.

[57] ABSTRACT

An optical guide inserted between a liquid crystal display panel and a diffusion plate is formed by using a large number of optical fibers each obtained by coating a core with a cladding layer, and its exit surface is inclined with respect to an incident surface by a predetermined angle θ1. Accordingly, in assembly, it suffices to incorporate this optical guide, thus facilitating the assembling operation. In this case, image light emerging from the exit surface of the optical guide obliquely upward to the left is refracted by a refractor in a direction perpendicular to the exit surface of the refractor.

9 Claims, 24 Drawing Sheets

OPTICAL IMAGE GUIDE SYSTEM

BACKGROUND OF THE INVENTION

The present invention relates to an optical image guide system for a display apparatus, e.g., a liquid crystal display apparatus and, more particularly, to an optical image guide system for a display apparatus that can enlarge the image.

In some display apparatuses, in order to enlarge or magnify images, a large number of optical fibers are arranged between a display comprising, e.g., a liquid crystal display panel, and a screen, and the distance among the end portions of the optical fibers is made larger on the screen side than that on the display side (for example, refer to Jpn. Pat. Appln. KOKAI Publication No. 2-294684). In this case, in the screen, a large number of through holes are formed in a screen plate, and a diffusion layer is formed on the surface of the screen plate. The exit surface-side end portions of the large number of optical fibers are inserted in the respective through holes of the screen plate from the lower surface side.

In a conventional display apparatus of this type, the exit surface-side end portions of the large number of optical fibers must be respectively inserted in the corresponding through holes of the screen plate one by one. This assembling operation takes much time and labor, leading to an increase in cost. And since the exit surface-side end portions of the optical fibers are inserted in the through holes of the screen plate manually, the optical fibers must be formed to have a relatively large length, leading to an increase in size of the entire apparatus.

BRIEF SUMMARY OF THE INVENTION

It is an object of the present invention to provide an optical image guide system whose assembling operation can be performed easily and overall size is compact.

In order to achieve the above object, according to the present invention, there is provided an optical image guide system comprising a display having an image display surface; an optical guide arranged on a display surface side of the display, and having a large number of linear optical guide lines arranged densely, and an exit surface which is an inclined surface inclined with respect to an incident surface; and a refractor arranged on an exit surface side of the optical guide to refract image light emerging from the exit surface in a predetermined direction.

According to the optical image guide system of the present invention, the image is enlarged in one predetermined direction in accordance with the angle of inclination of the exit surface of the optical guide with respect to the incident surface. For example, if the angle of inclination of the exit surface of the optical guide with respect to the incident surface is about 60° to about 84.3°, the image can be enlarged 2 to 10 times in the predetermined direction. Since the optical guide has a large number of linear optical guide lines that are arranged densely, when assembling the apparatus, it suffices to incorporate this optical guide, thus facilitating the assembling operation. Since the exit surface of the optical guide is an inclined surface which is inclined with respect to the incident surface, the shape of the side surface of the optical guide can be formed as, e.g., a right-angled triangle. Since the incident surface of the optical guide need only be arranged on the image display surface side of the display, when the exit surface of the optical guide is vertical, the depth of the optical guide can be set to almost equal to the depth of the display, leading to a reduction in size of the entire apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
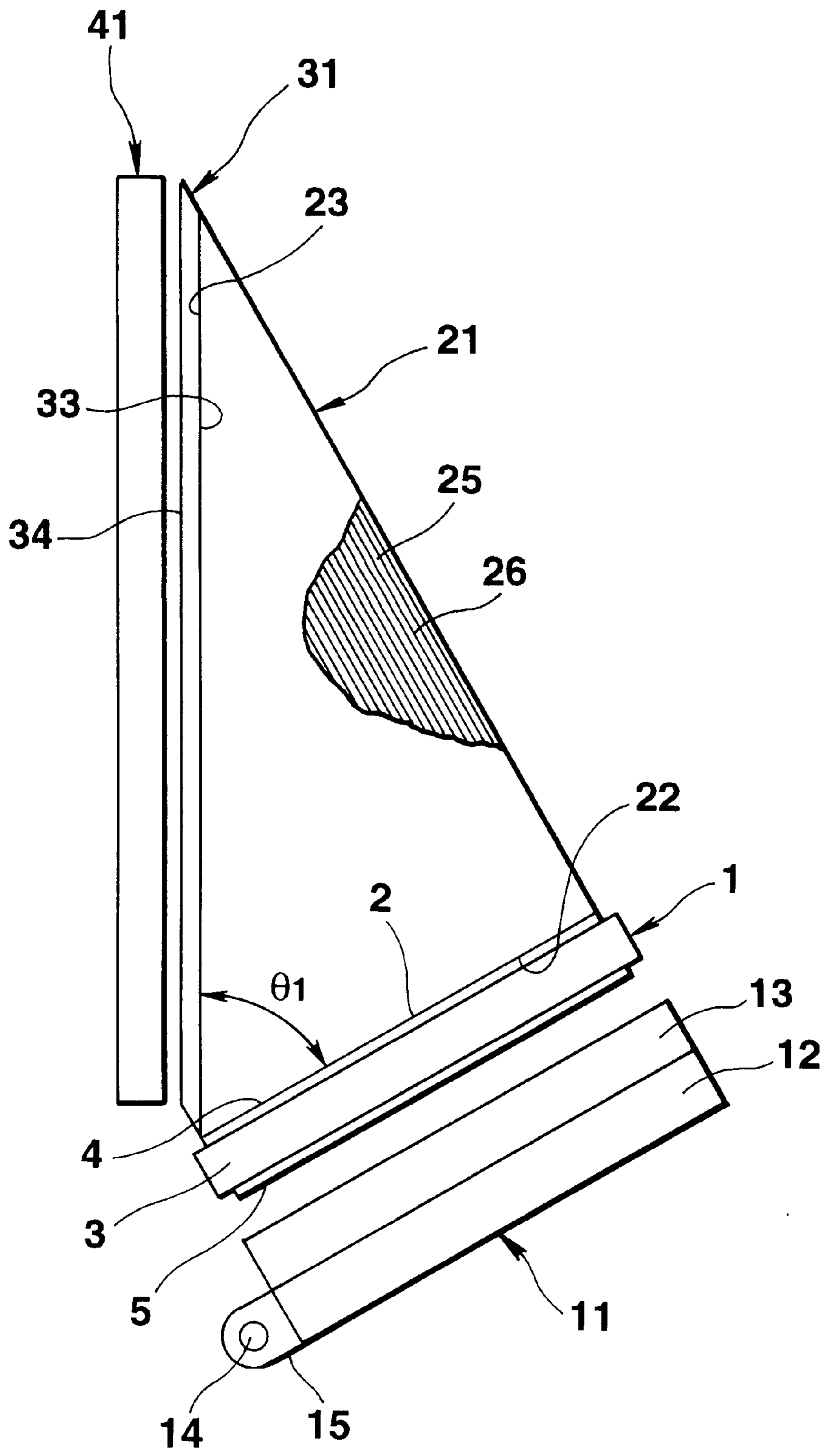
FIG. 1 is a partially cutaway side view showing the main part of a display apparatus according to the first embodiment of the present invention.

FIG. 1 is a partially cutaway side view showing the main part of a display apparatus according to the first embodiment of the present invention. This display apparatus has a liquid crystal display panel (display) 1. The liquid crystal display panel 1 is inclined against a horizontal plane by a predetermined angle with its image display surface 2 located on the upper side. A backlight unit 11 is arranged on the lower surface side of the liquid crystal display panel 1 to be parallel to the liquid crystal display panel 1. An optical guide 21 is arranged on the image display surface 2 side of the liquid crystal display panel 1 such that its incident surface 22 opposes the display surface 2. The optical guide 21 has a right-angled triangle having an exit surface 23 which is inclined with respect to the incident surface 22 by a predetermined angle $\theta 1$. In this case, the exit surface 23 of the optical guide 21 extends vertically. A refractor 31 and a diffusion plate (screen) 41 are sequentially arranged on the exit surface 23 side of the optical guide 21.

In the liquid crystal display panel 1, polarizing plates 4 and 5 are adhered to the upper and lower surfaces, respectively, of a liquid crystal cell 3. The liquid crystal display panel 1 is an active matrix type color liquid crystal display panel having thin film transistors as switching elements, but is slightly different from an ordinary liquid crystal display panel. More specifically, one of transparent substrates where the thin film transistors and the like are formed of the liquid crystal cell 3 of the liquid crystal display panel 1 has a structure as shown by the equivalent circuit diagram in FIG. 2. Gate lines 7 and data lines 8 are arranged in a matrix on the upper surface of this one transparent substrate 6, and near the intersections of the gate and data lines 7 and 8, pixel electrodes 9 are connected to the lines 7 and 8 through thin film transistors 10. While the distance among the gate lines 7 is equal to that of the ordinary liquid crystal display panel, the distance among the data lines 8 is larger than that of the ordinary liquid crystal display panel. For example, the enlargement factor of the distance between the adjacent data lines 8 is 2 to 10 times that of the ordinary liquid crystal display panel. Accordingly, regarding the size of each pixel electrode 9, its length in the vertical direction along the data lines 8 is equal to that of the ordinary liquid crystal display panel, while its length in the horizontal direction along the gate lines 7 is 2 to 10 times that of the ordinary liquid crystal display panel. Therefore, as will be described later, when image light emerging from the image display surface 2 of the liquid crystal display panel 1 is enlarged 2 to 10 times in one predetermined direction, i.e., in the direction of the data lines 8, a 2× to 10× image of an image obtained with the ordinary liquid crystal display panel can be obtained.

The backlight unit 11 shown in FIG. 1 will be described. The backlight unit 11 includes an optical guide 12 serving as a surface light source, a collimating optical guide 13, a fluorescent tube 14, and a reflecting film 15. The collimating optical guide 13 is arranged on the upper surface of the optical guide 12. The fluorescent tube 14 and the reflecting film 15 are arranged on one predetermined end side of the optical guide 12. Of these components, the optical guide 12 comprises a transparent member made of, e.g., an acrylic resin. Light incident on the optical guide 12 through its one predetermined end face is guided into the optical guide 12, and the guided light is totally reflected by the lower surface of the optical guide 12 and is output from the entire upper surface of the optical guide 12, so that the optical guide 12 serves as a surface light source. The collimating optical guide 13 comprises a collimation lens array, an optical fiber array, or the like. Light reaching the lower surface of the collimating optical guide 13 is output from its upper surface as parallel light perpendicular to the upper surface. Light emitted by the fluorescent tube 14 and reflected by the reflecting film 15 enters one predetermined end face of the optical guide 12 to form a surface light source. The light as the surface light source is collimated by the collimating optical guide 13 into parallel light perpendicular to the lower surface of the liquid crystal display panel 1. Then, this parallel light is irradiated onto the lower surface of the liquid crystal display panel 1.

Figure 3:
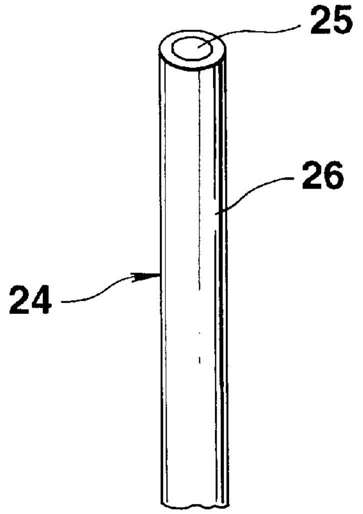
FIG. 3 is a perspective view showing an optical fiber originally prepared for formation of an optical guide shown in FIG. 1.
Figure 4:
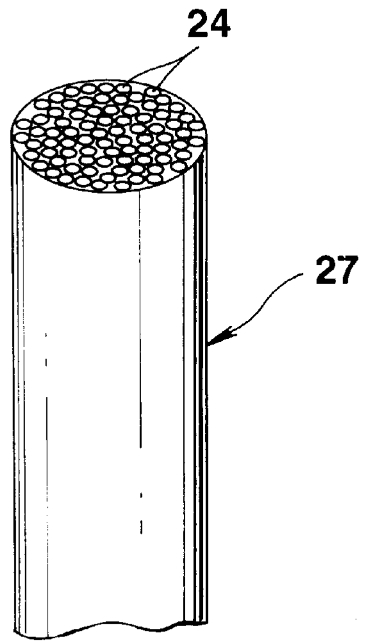
FIG. 4 is a perspective view showing a forming step subsequent to FIG. 3, in which an optical fiber bundle is formed.

The optical guide 21 shown in FIG. 1 will be described, together with its forming method, with reference to FIGS. 3 to 6 sequentially. A large number of optical fibers 24 one of which is shown in FIG. 3, each having a predetermined length, are prepared. Each optical fiber 24 is obtained by coating a core 25 made of a high-refractive acrylic resin with a cladding layer 26 made of a low-refractive fluoroplastic. In this case, for example, the diameter of the core 25 is about 10 $\mu$m to 60 $\mu$m, and the thickness of the cladding layer 26 is about 5 $\mu$m to 20 $\mu$m. As shown in FIG. 4, for example, about 1,500 to 2,500 optical fibers 24 are bundled to form an optical fiber bundle 27 having a diameter of about 6 mm to 10 mm.

Figure 5:
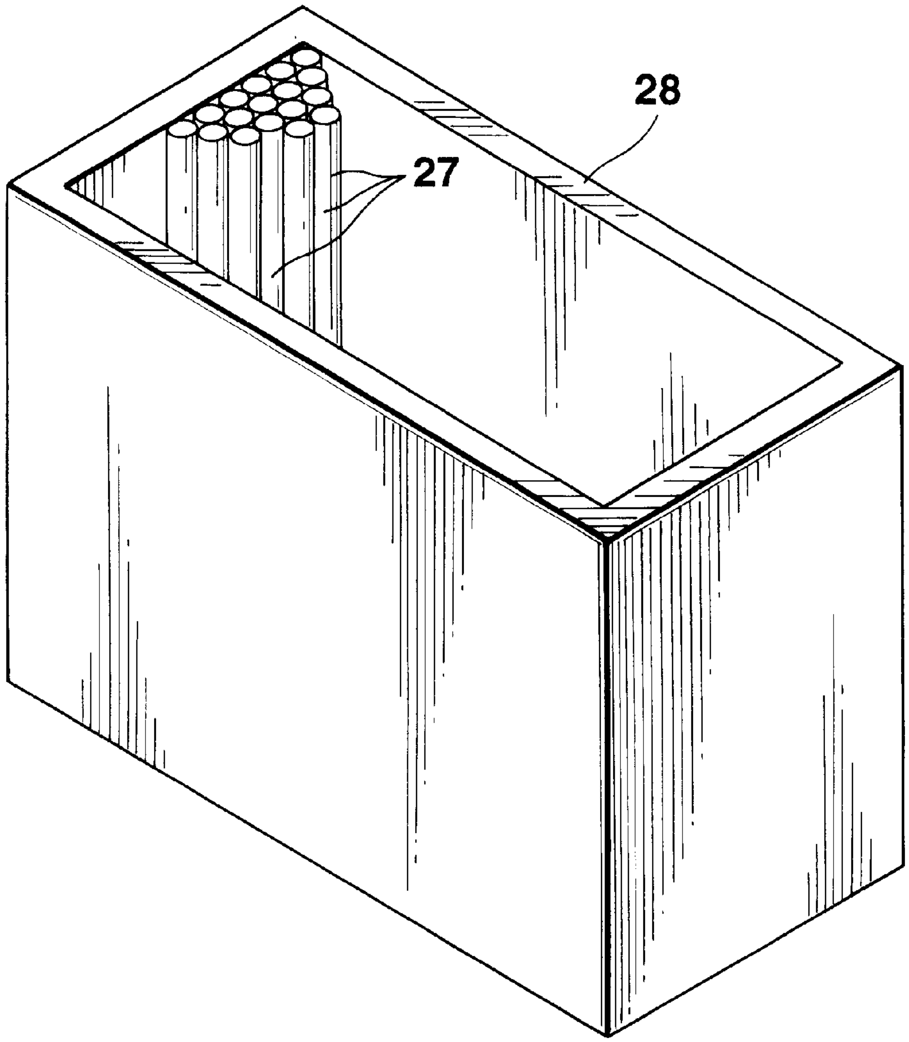
FIG. 5 is a perspective view showing a forming step subsequent to FIG. 4, in which a plurality of optical fiber bundles are accommodated in a lower die.
Figure 6A:
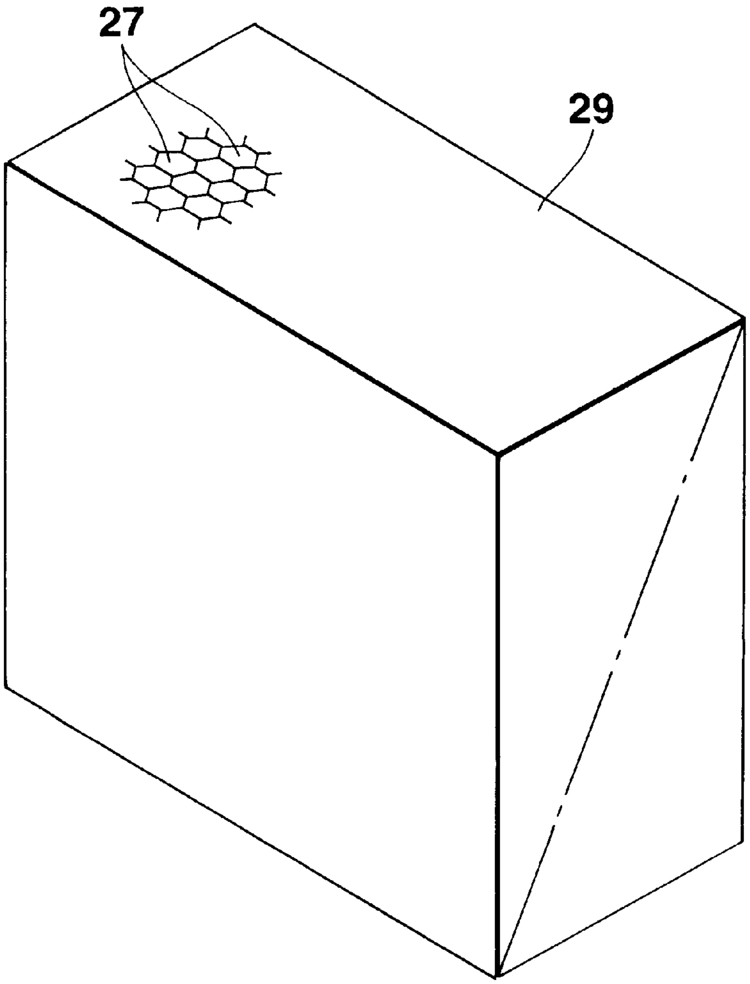
FIG. 6A is a perspective view showing a forming step subsequent to FIG. 5, in which an optical fiber block is formed.
Figure 6B:
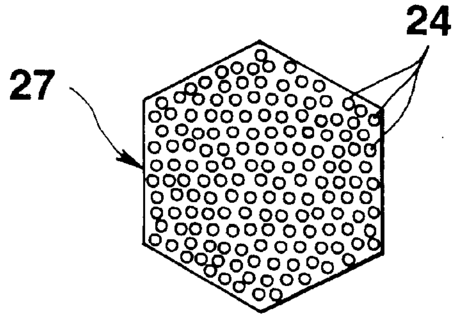
FIG. 6B is a plan view of part of the optical fiber block shown in FIG. 6A.

A plurality of optical fiber bundles 27 are crowded in a lower die 28 having a rectangular parallelepiped inner portion, as shown in FIG. 5. The interior of the lower die 28 is tightly sealed with an upper die (not shown), and the resultant structure is heated. As a result, the cladding layers 26 of the optical fibers 24 fuse and expand to fill the space among the plurality of optical fiber bundles 27. The large number of cores 25 are bonded with each other through the cladding layers 26 to fill the lower die 28 and the upper die. As a result, a rectangular parallelepiped optical fiber block 29 as shown in FIG. 6A is obtained. In this case, the respective optical fiber bundles 27 push each other in the optical fiber block 29 except for those in the outer periphery in the dies, so that each handle forms a regular hexagon when seen from above, as shown in FIG. 6B. Alternately, before tightly sealing the interior of the lower die 28 with the upper die, the space among the plurality of optical fiber bundles 27 may be filled with a material which is the same as or different from that of the cladding layers 26. Subsequently, the optical fiber block 29 is cut along a diagonal on its predetermined side surface (a surface making the angle θ1 with the upper surface), as indicated by a one dot-dash line in FIG. 6A, to obtain two optical guides 21 each having a right-angled triangular side surface, as shown in FIG. 1. In each optical guide 21 obtained in this manner, the large number of cores (linear optical guide lines) 25 are arranged densely, the cores 25 are coated with the cladding layers 26 and are bonded with each other through the cladding layers, and its exit surface 23 forms an inclined surface inclined with respect to its incident surface 22 by the predetermined angle θ1.

The incident surface 22 of the optical guide 21 is in tight contact with or close to the image display surface 2 of the liquid crystal display panel 1. In this case, the size of the incident surface 22 of the optical guide 21 is set to be equal to or slightly larger than the size of the image display surface 2 of the liquid crystal display panel 1. If the angle θ1 formed by the incident surface 22 and exit surface 23 of the optical guide 21 is about 60° to about 84.3°, the length of the exit surface 23 is 2 to 10 times that of the incident surface 22 on the side surface of the optical guide 21. According to another forming method of the optical guide 21, in place of the optical fibers 24 as shown in FIG. 3, optical fibers 24 several times longer than them may be prepared to form a thin, elongated optical fiber block 29, and this optical fiber block 29 may be cut into segments each having a predetermined length, thereby obtaining a plurality of optical fiber blocks 29 identical to that shown in FIG. 6A. Alternatively, cores 25 may be formed by extrusion molding. A bundle of about 1,500 to 2,500 cores 25 may be passed through a tank containing a fused cladding layer material. The cladding layer material attaching to the cores 25 may then be allowed to solidify to obtain an optical fiber bundle 27 identical to that shown in FIG. 4.

Figure 7:
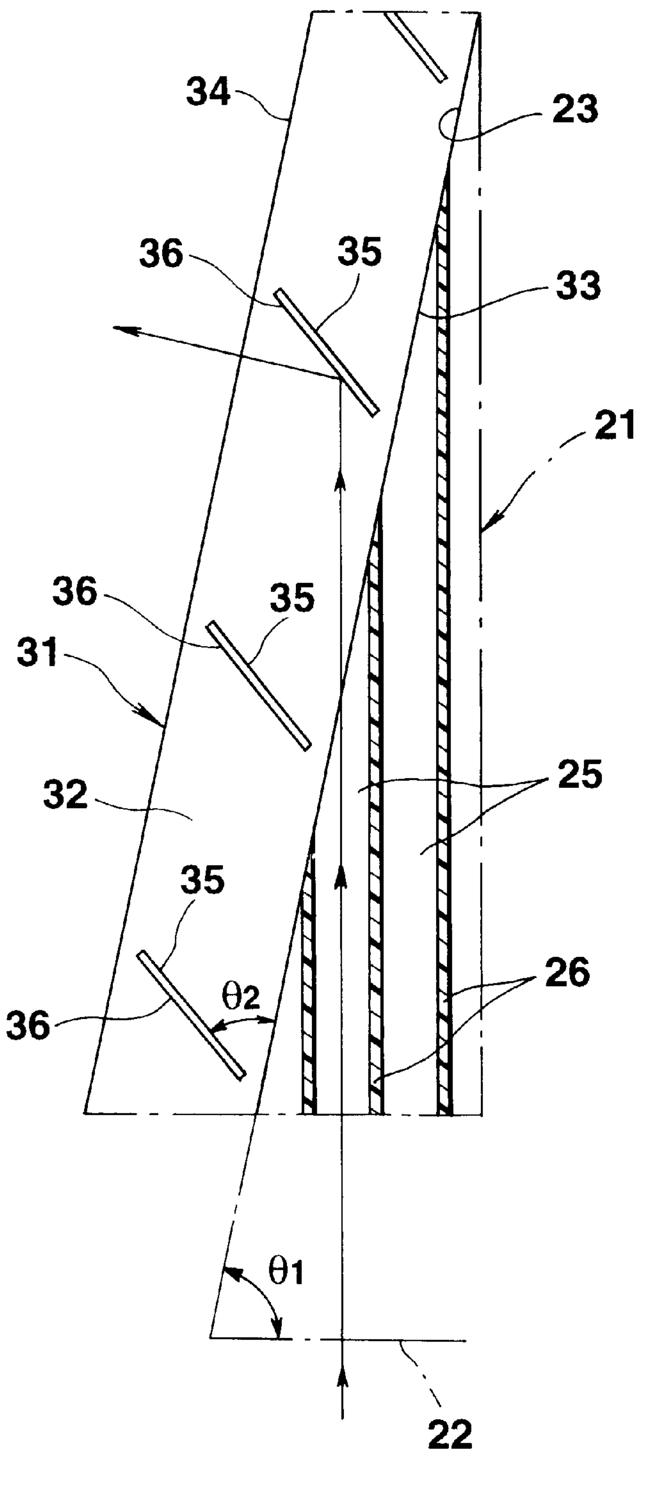
FIG. 7 is a longitudinally sectional side view of part of the optical guide and a refractor shown in FIG. 1.
Figure 8:
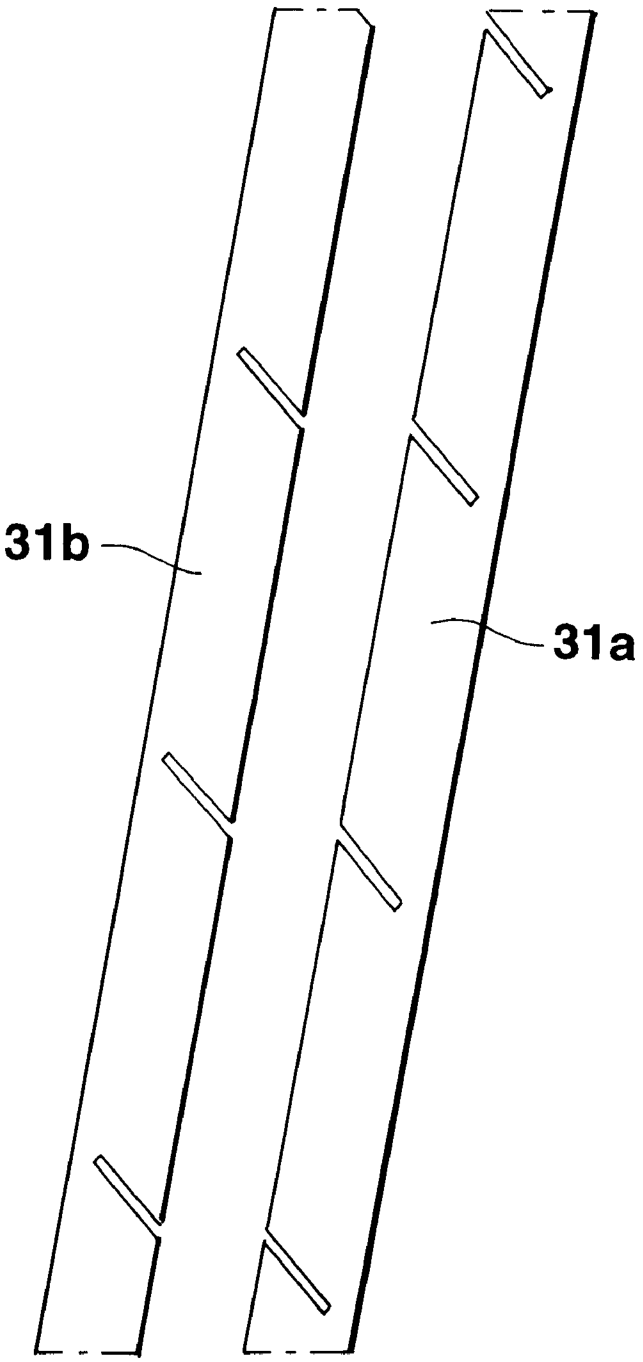
FIG. 8 is a view for explaining an example of a method of forming the refractor shown in FIG. 7.

The refractor 31 shown in FIG. 1 will be described with reference to FIG. 7. The refractor 31 has a flat plate-like refractor body 32 formed with the same material as that of the cores 25 of the optical guide 21 or a material having a refractive index close to that of the cores 25. One surface of the refractor body 32 serves as an incident surface 33, while the other surface thereof serves as an exit surface 34 parallel to the incident surface 33. A plurality of plate-like refracting layers 35 inclined with respect to the incident surface 33 by a predetermined angle θ2 (this angle θ2 will be described later) are formed in the refractor body 32 at a predetermined pitch of arrangement. The refracting layers 35 are made of air or the like having a refractive index largely different from that of the refractor body 32. The two end portions of each refracting layer 35 in the widthwise direction (the two end portions in the direction of thickness of the refractor body 32) are closed, while the two end portions thereof in the longitudinal direction are open to the atmosphere. As the refractive index of the refracting layers 35 is largely different from that of the material (e.g., an acrylic resin) of the refractor body 32, predetermined interfaces between the refracting layers 35 and the refractor body 32 serve as reflecting surfaces (refracting surfaces) 36. The pitch of arrangement of the refracting layers 35 is the same as that of the cores 25 at the exit surface 23 of the optical guide 21. The incident surface 33 of the refractor 31 is adhered to the exit surface 23 of the optical guide 21 with an adhesive (not shown) made of, for example, an acrylic resin. In this state, the exit surface 34 of the refractor 31 is parallel to the exit surface 23 of the optical guide 21. The refractor 31 may be formed by monolithic molding. Alternatively, as shown in FIG. 8, refractor halves 31*a* and 31*b* may be molded to have a shape identical to that obtained by dividing the refractor 31 in the direction of thickness, and these refractor halves 31*a* and 31*b* may be adhered to each other with an adhesive (not shown) made of an acrylic resin. Alternatively, a refractor half 31*a* or 31*b* may be formed to have a thickness twice that of the above-described refractor half 31*a* or 31*b*, and a refractor 31 may be formed with only the refractor half 31*a* or 31*b*.

The reason of forming the refractor body 32 of the refractor 31 with the same material as that of the cores 25 of the optical guide 21 or the material having the refractive index close to that of the cores 25 will be described. As the acrylic resin is employed as the material of the cores 25, if the angle θ1 formed by the incident surface 22 and the exit surface 23 of the optical guide 21 is about 47° or more, light perpendicularly incoming on the incident surface 22 of the optical guide 21 is totally reflected by the exit surface 23 of the optical guide 21. When the refractor body 32 of the refractor 31 is made of, e.g., an acrylic resin, and the incident surface 33 of the refractor 31 is adhered to the exit surface 23 of the optical guide 21 with the adhesive made of an acrylic resin, even if the angle θ1 formed by the incident surface 22 and the exit surface 23 of the optical guide 21 is about 47° or more, light perpendicularly incoming on the incident surface 22 of the optical guide 21 is not totally reflected by the exit surface 23 of the optical guide 21 but travels straight to enter the incident surface 33 of the refractor 31.

The diffusion plate 41 shown in FIG. 1 will be described. The diffusion plate 41 is obtained by densely forming a large number of very small lens portions (not shown) on the entire portion of one surface of a resin sheet having substantially the same size as that of the exit surface 34 of the refractor 31. Although in FIG. 1 the diffusion plate 41 is arranged at a predetermined gap with respect to the exit surface 34 of the refractor 31 to be parallel to it, it may be arranged in tight contact with the exit surface 34 of the refractor 31.

Enlarged image display by means of this display apparatus will be described with reference to FIG. 1. When parallel light perpendicular to the lower surface of the liquid crystal display panel 1 emerges from the upper surface of the collimating optical guide 13 of the backlight unit 11, image light in accordance with image driving of the liquid crystal display panel 1 emerges from the image display surface 2 of the liquid crystal display panel 1 and is perpendicularly incident on the incident surface 22 of the optical guide 21. The incident image light travels straight in the respective cores 25 of the optical guide 21 along the core central axes, directly emerges from the exit surface 23 of the optical guide 21, and directly becomes incident on the incident surface 33 of the refractor 31. The incident image light is reflected (refracted) by the reflecting surfaces 36 of the refractor 31, to become image light perpendicular to the exit surface 34 of the refractor 31 (i.e., the exit surface 23 of the optical guide 21), as will be described later, and is enlarged in one predetermined direction. The enlarged image light emerges from the exit surface 34 of the refractor 31 in a direction perpendicular to the exit surface 34. The emerging image light is transmitted through the diffusion plate 41 shown in FIG. 1 and is diffused by the small lens portions of the diffusion plate 41. The diffused image light is visually observed.

Figure 9:
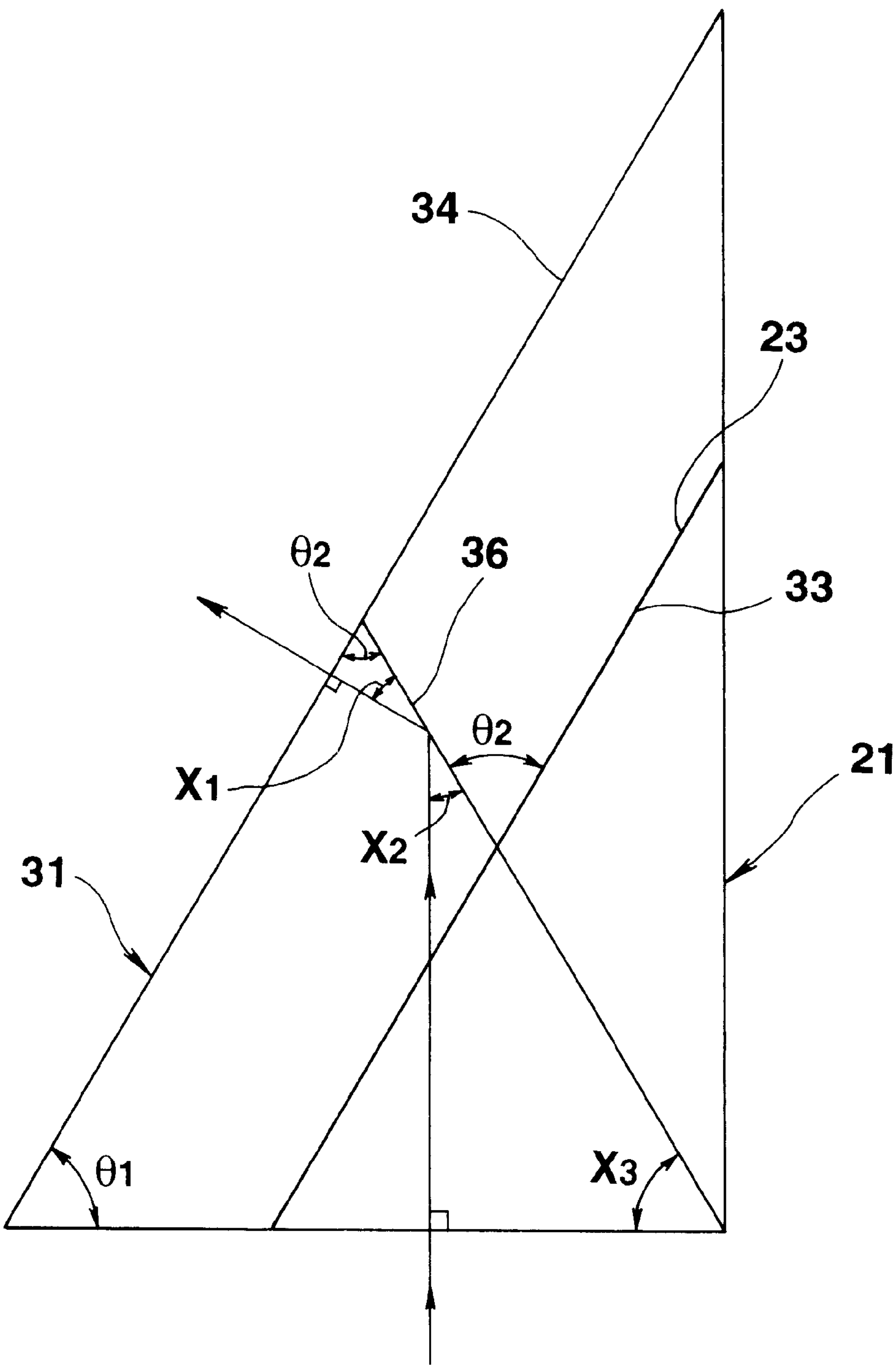
FIG. 9 is a view for explaining an angle $\theta 2$ between the reflecting surface of the refractor shown in FIG. 7 and the incident surface.

How the image light reflected by the reflecting surfaces 36 of the refractor 31 becomes image light perpendicular to the exit surface 34 of the refractor 31 will be described with reference to FIG. 9. Assume that an image light beam reflected by the reflecting surface 36 of the refractor 31 becomes an image light beam perpendicular to the exit surface 34 of the refractor 31, as indicated by arrows in FIG. 9. An angle x1 formed by the reflecting surface 36 and the image light beam reflected by the reflecting surface 36 is expressed by the following equation (1):

$$x1=90-\theta 2 \quad (1)$$

Similarly, an angle x2 formed by the reflecting surface 36 and the image light beam incident on the reflecting surface 36 is given by the following equation (2):

$$x2=90-x3 \quad (2)$$

In this case, a substitution of 180−θ1−θ2 for x3 in equation (2) yields x2:

$$x2=\theta 1+\theta 2-90 \quad (3)$$

Since x1 equals x2, from equations (1) and (3) we have:

$$\theta 2=90-\theta 1/2 \quad (4)$$

Therefore, if the angle θ2 formed by the incident surface 33 and the reflecting surface 36 of the refractor 31 is θ2=90−θ1/2, the image light beam reflected by the reflecting surface 36 of the refractor 31 can become an image light beam perpendicular to the exit surface 34 of the refractor 31.

Figure 10:
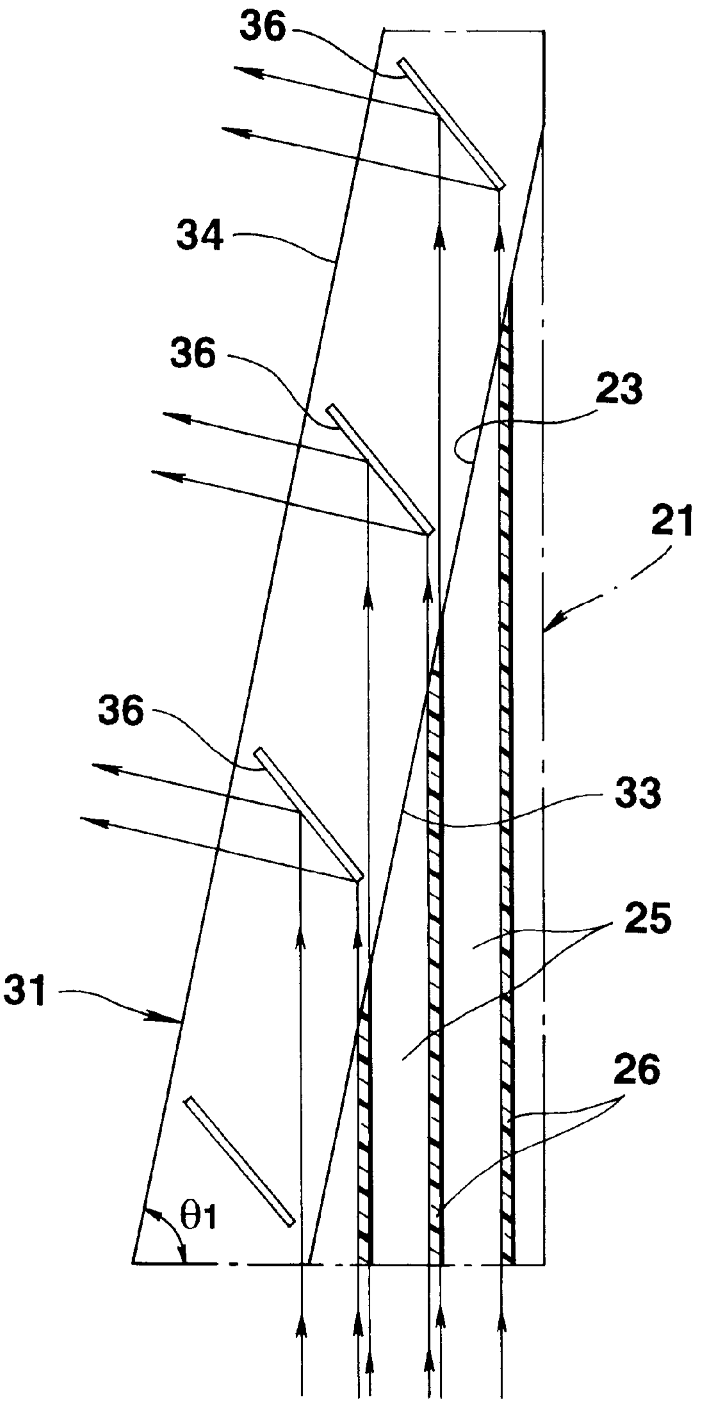
FIG. 10 is a view for explaining how image light reflected by the reflecting surface of the refractor shown in FIG. 7 is enlarged in one predetermined direction.

Enlargement of image light reflected by the reflecting surfaces 36 of the refractor 31 in one predetermined direction will be described with reference to FIG. 10. As indicated by arrows in FIG. 10, image light beams traveling straight in the respective cores 25 of the optical guide 21 along the core central axes are reflected by the reflecting surfaces 36 of the refractor 31 to become image light beams perpendicular to the exit surface 34 of the refractor 31. In this case, assuming that the image light beam emerging from the exit surface 23 of one core 25 is entirely reflected by one reflecting surface 36, the size of the image light beam emerging from the exit surface 34 of the refractor 31 with respect to one core 25 becomes equal to the sectional size of one core 25 perpendicular to the central axis of this core 25. However, while the large number of cores 25 are arranged densely, image light beams emerging from the exit surface 34 of the refractor 31 and respectively corresponding to the cores 25 are separated from each other in accordance with the pitch of arrangement of the reflecting surfaces 36 of the refractor 31 in the direction of arrangement of the reflecting surfaces. This separation factor is expressed by the length of the exit surface 23 with respect to the length of the incident surface 22 on the side surface of the optical guide 21. Hence, as described above, if the angle θ1 formed by the incident surface 22 and the exit surface 23 of the optical guide 21 is about 60° to about 84.3°, the length of the exit surface 23 is 2 to 10 times that of the incident surface 22 on the side surface of the optical guide 21, and the separation factor in this case becomes 2 to 10 times accordingly. As a result, image light emerging from the image display surface 2 of the liquid crystal display panel 1 is enlarged 2 to 10 times in the direction of arrangement of the reflecting surfaces 36 of the refractor 31, and a 2× to 10× image of an image obtained with an ordinary liquid crystal display panel can thus be obtained. In FIG. 10, θ1 is about 78.5°. In this case, a 5× image of the image on the incident surface is obtained on the exit surface.

Figure 2:
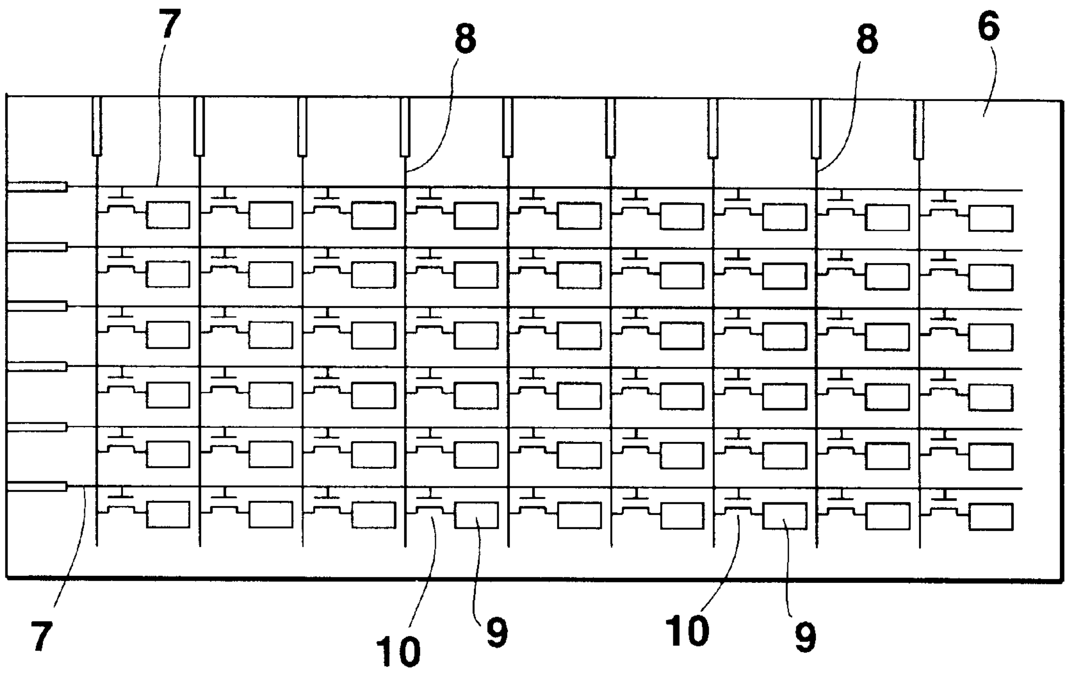
FIG. 2 is an equivalent circuit diagram of one of the transparent substrates of a liquid crystal display panel shown in FIG. 1.

Assuming that the size of each pixel electrode 9 shown in FIG. 2 along the data line 8 is about 100 μm, since the diameter of each core 25 of the optical guide 21 is about 10 μm to 60 μm, image light corresponding to one pixel electrode 9 is guided by several cores 25 or more. The image light enlarged 2 to 10 times in the direction of arrangement of the reflecting surfaces 36 in the refractor 31 forms bright spots separated from each other on the exit surface 34 of the image display surface 2. However, since these bright spots are diffused by the diffusion plate 41, they can be visually observed with good contrast throughout a wide angle of view.

In this display apparatus, the optical guide 21 is formed by densely arranging a large number of cores 25. Therefore, in assembly of the display liquid crystal display panel 1, it suffices to incorporate the optical guide 21, thus facilitating the assembling operation. The incident surface 22 of the columnar optical guide 21 having a right-angled side surface need only be arranged on the image display surface 2 side of the liquid crystal display panel 1. Thus, if the exit surface 23 of the optical guide 21 is set vertically, the depth of the optical guide 21 portion can be set to almost equal to the depth of the liquid crystal display panel 1, leading to a reduction in size of the entire apparatus. In addition, in this case, the depth of the liquid crystal display panel 1 substantially coincides with the direction of the data lines 8 shown in FIG. 2, and the size of the pixel electrodes 9 in this direction is equal to that of the ordinary liquid crystal display panel. Therefore, the depth of the liquid crystal display panel 1 of this display apparatus can be prevented from increasing.

Figure 11:
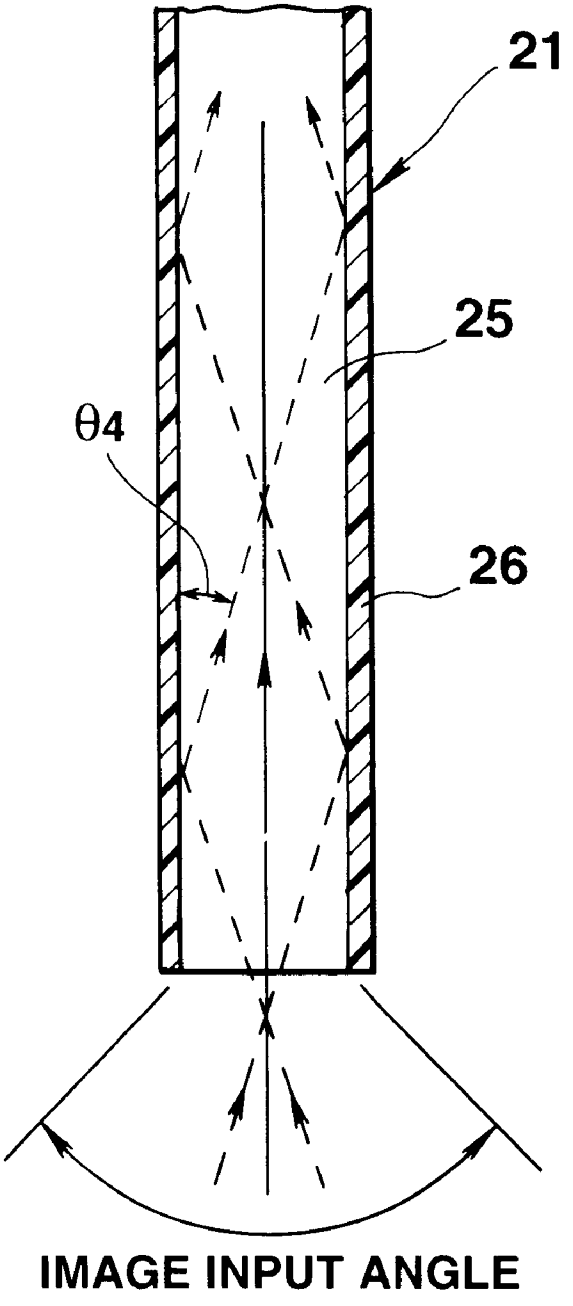
FIG. 11 is a view for explaining the characteristics of the core of the optical guide.

If the backlight unit 11 does not have the collimating optical guide 13, image light emerging from the image display surface 2 of the liquid crystal display panel 1 becomes scattered light. As shown in FIG. 11, even if the image input angle to each core 25 of the optical guide 21 is small, an image light beam that propagates through the core 25 while repeating total reflection is generated, as indicated by broken lines, in addition to an image light beam that travels straight in the core 25 along its central axis, as indicated by a solid line. Concerning the former image light beam that propagates in the core 25 while repeating total reflection, even if it is reflected by the corresponding reflecting surface 36 of the refractor 31 shown in FIG. 7, it cannot form an image light beam perpendicular to the exit surface 34 of the refractor 31. As a result, when seen from the front surface of the diffusion plate 41, the brightness lowers.

Figure 12:
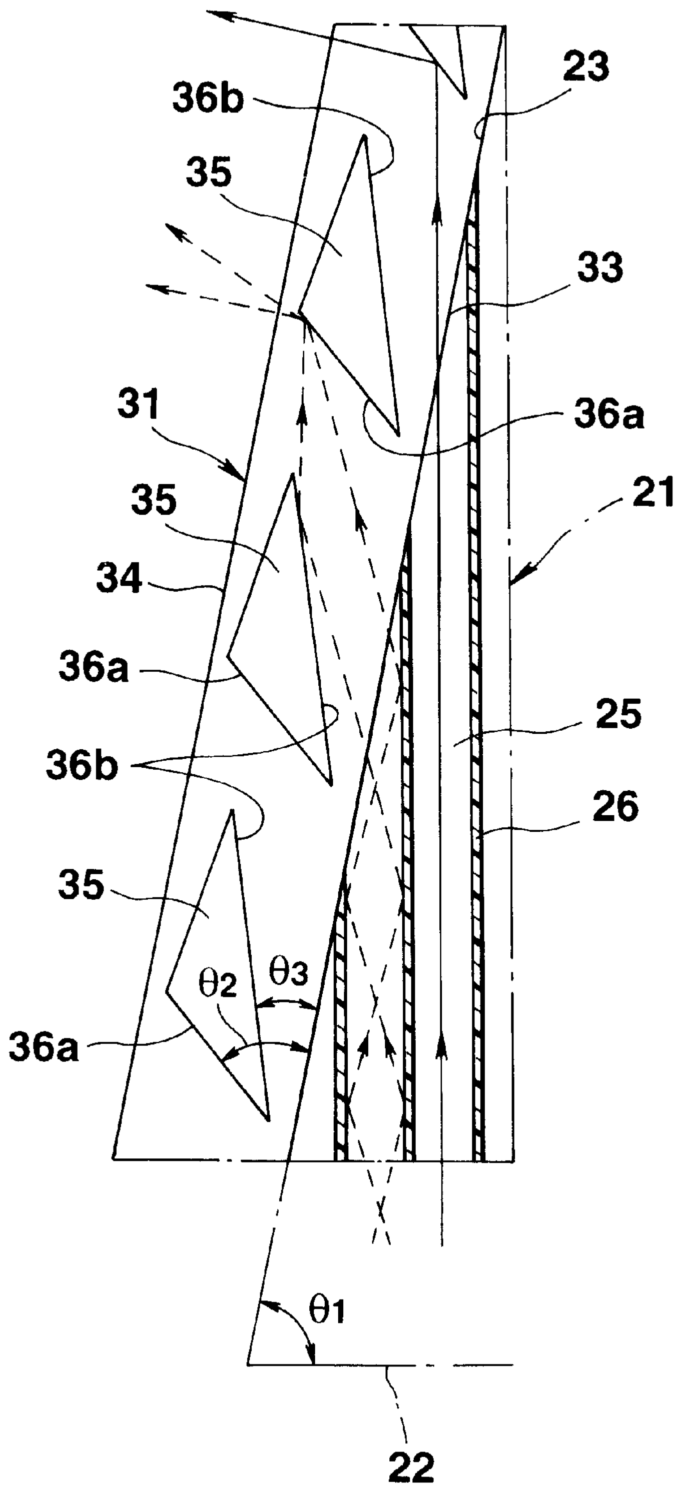
FIG. 12 is a longitudinally sectional side view, similar to FIG. 7, of a display apparatus according to the second embodiment of the present invention.
Figure 13:
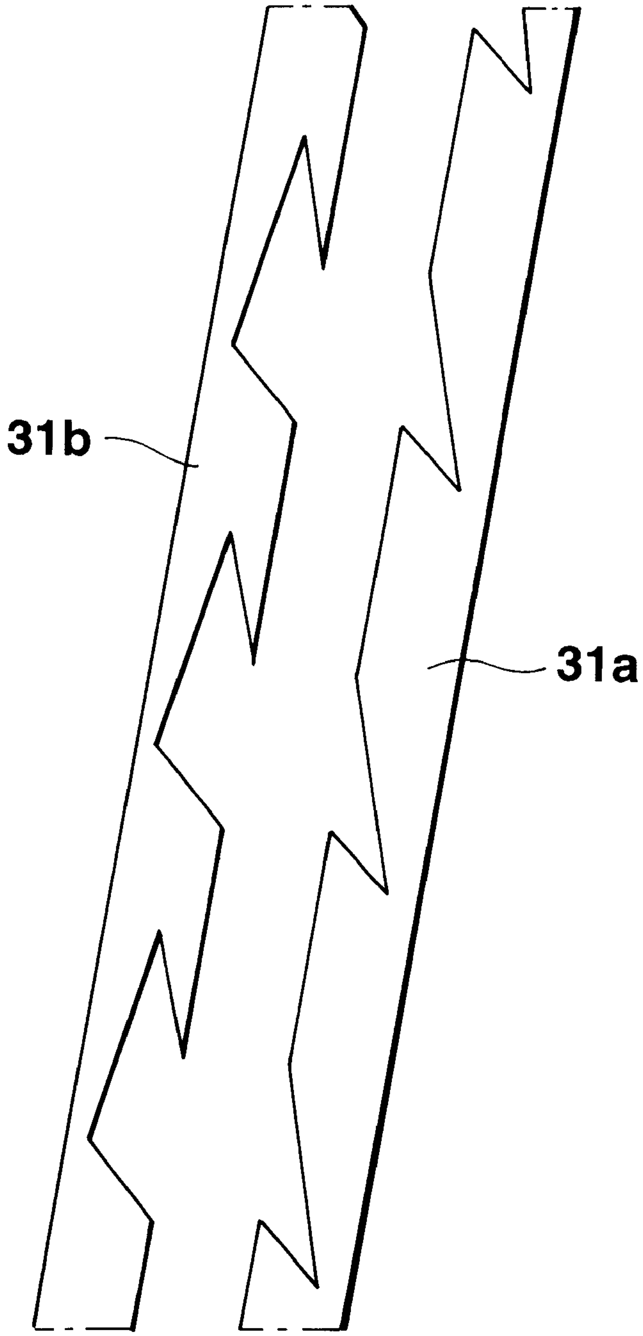
FIG. 13 is a view for explaining an example of a method of forming a refractor shown in FIG. 12.

The second embodiment of the present invention that can increase the brightness of the diffusion plate 41 when seen from the front surface will be described with reference to FIG. 12. Note that in FIG. 12 θ1=78.5°. A refractor 31 of this display apparatus has refracting layers 35 each having a predetermined triangular prismatic shape. Each refracting layer 35 has a first reflecting surface **36*a* inclined with respect to an incident surface 33 by the same angle θ2 as that of the reflecting surfaces 36 shown in FIG. 7, and a second reflecting surface 36*b* inclined with respect to the incident surface 33 by a predetermined angle θ3 (this angle θ3 will be described later). The refractor 31 may be formed by monolithic molding, in the same manner as in the first embodiment described above. Alternatively, as shown in FIG. 13, refractor halves 31*a* and 31*b* may be molded to have a shape identical to that obtained by dividing the refractor 31 in the direction of thickness, and these refractor halves 31*a* and 31*b* may be adhered to each other with an adhesive (not shown) made of an acrylic resin. Part of image light propagating in each core 25 of the optical guide 21 while repeating total reflection, as indicated by broken lines in FIG. 12, is reflected by the second reflecting surface 36*b* comprising the interface between the refractor 31 and the corresponding lower refracting layer 35 of the refractor 31, and is reflected by the first reflecting surface 36***a* comprising the interface between the refractor 31 and the corresponding upper refracting layer 35 of the refractor 31, to become image light perpendicular to the exit surface 34 of the refractor 31 (i.e., the exit surface 23 of the optical guide 21), as will be described later. This image light emerges from the exit surface 34 of the refractor 31 in a direction perpendicular to the exit surface 34.

The angle $\theta 3$ will be described. Assume that the maximum total reflection angle of image light that propagates in the core 25 of the optical guide 21, as indicated by broken lines in FIG. 11, while repeating total reflection is defined as $\theta$. The maximum total reflection angle $\theta 4$ is determined by the materials of the core 25 and the cladding layer 26. As shown in FIG. 12, image light which is reflected by the second reflecting surface 36*b* of each lower refracting layer 35 of the refractor 31 and thereafter reflected by the first reflecting surface 36*a* of its upper refracting layer 35 becomes image light perpendicular to the exit surface 34 of the refractor 31. In other words, image light which is reflected by the second reflecting surface 36*b* of each lower refracting layer 35 of the refractor 31 and is thereafter incident on the first reflecting surface 36*a* of its upper refracting layer 35 of the refractor 31 becomes light parallel to the central axis of the core 25 of the optical guide 21. More specifically, an angle x4 (see FIG. 14) formed by the second reflecting surface 36*b* of each lower refracting layer 35 of the refractor 31 and the light parallel to the central axis of the core 25 is half the maxim total reflection angle $\theta 4$ of the core 25 of the optical guide 21, and is expressed by the following equation (5):

$$x4=\theta 4/2 \tag{5}$$

An angle x5 (see FIG. 14) formed by the image light which is reflected by the second reflecting surface 36*b* of each lower refracting layer 35 of the refractor 31 and is incident on the first reflecting surface 36*a* of its upper refracting layer 35 of the refractor 31, and the incident surface 33 of the refractor 31 is:

$$x5=90-\theta 1 \tag{6}$$

Figure 14:
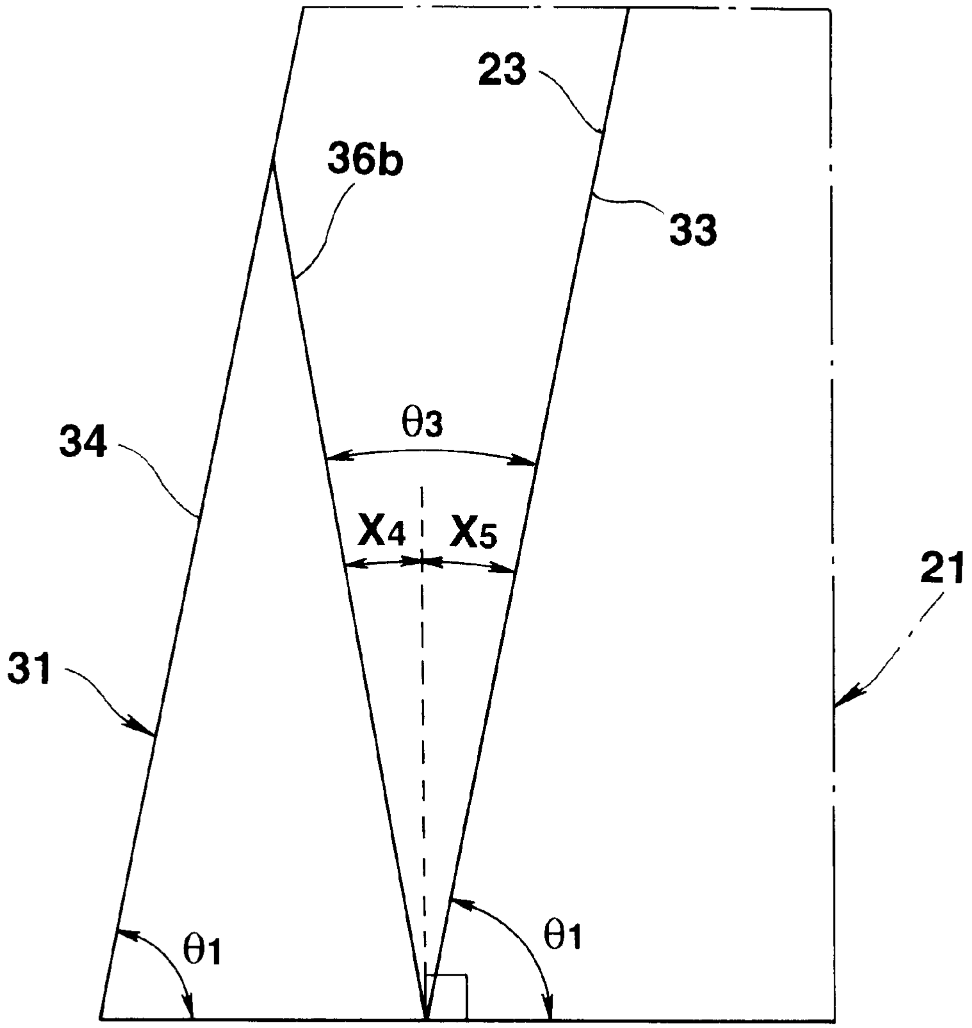
FIG. 14 is a view for explaining an angle $\theta 3$ between the second reflecting surface of the refractor shown in FIG. 12 and the incident surface.

In this case, since $\theta 3$ is the sum of x4 and x5, as shown in FIG. 14, from equations (5) and (6) we have:

$$\theta 3=90-\theta 1+\theta 4/2 \tag{7}$$

Accordingly, assuming that the angle $\theta 3$ formed by the incident surface 33 of the refractor 31 and the second reflecting surface 36*b* is defined to satisfy $\theta 3=(90-\theta 1+\theta 4/2)$, part of the image light propagating in the core 25 of the optical guide 21 while repeating total reflection, as indicated by the arrows of broken lines in FIG. 12, can form image light perpendicular to the exit surface 34 of the refractor 31. As a result, the brightness of the diffusion plate 41 when seen from the front surface can be increased.

Figure 15:
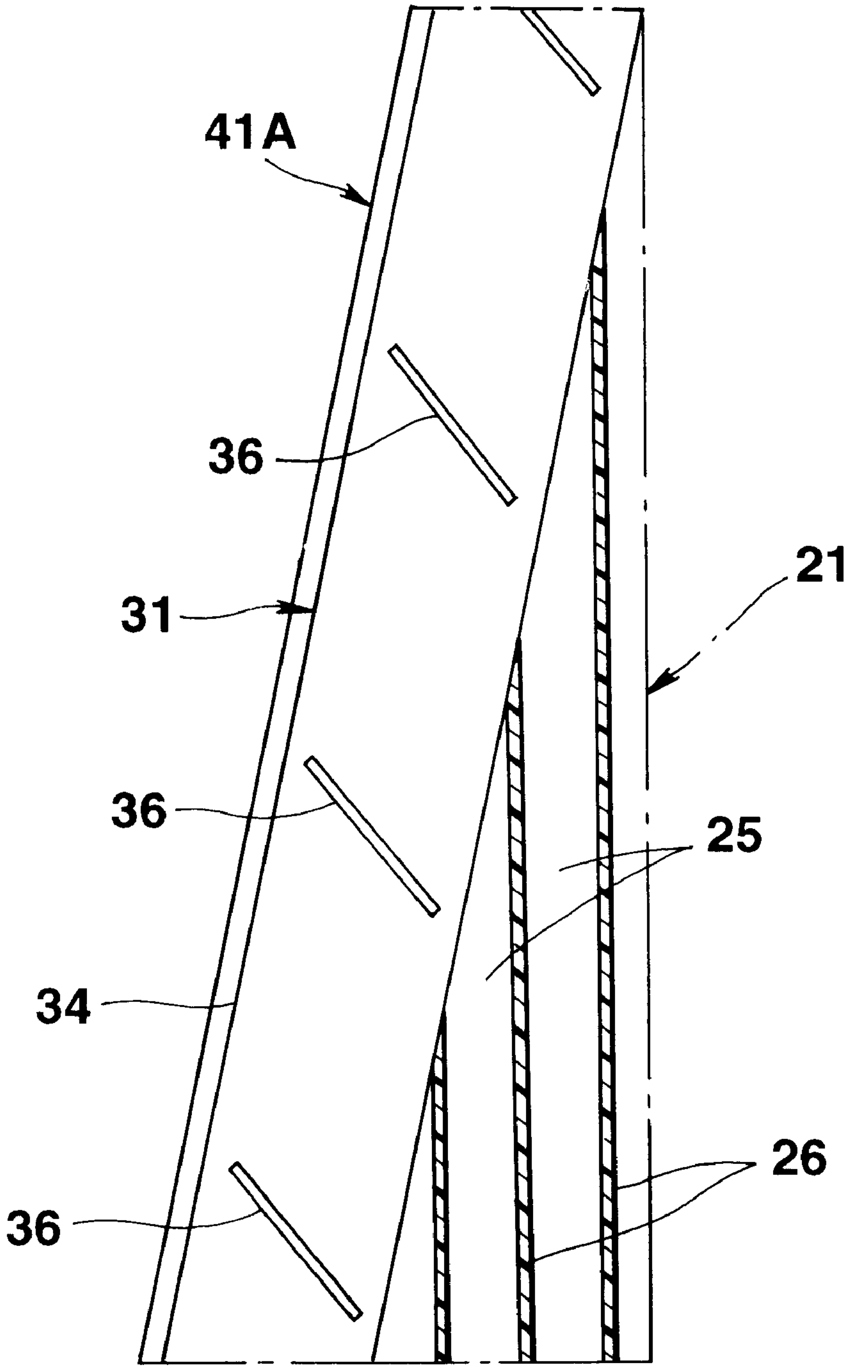
FIG. 15 is a longitudinally sectional side view, similar to FIG. 7, of a display apparatus according to the third embodiment of the present invention.

In the above embodiments, the diffusion plate 41 is used, as shown in, e.g., FIG. 1. However, the present invention is not limited to this. For example, as indicated by the third embodiment shown in FIG. 15, a diffusion layer 41A made of very small lens portions may be directly, integrally formed on the entire portion of an exit surface 34 of a refractor 31.

Figure 16:
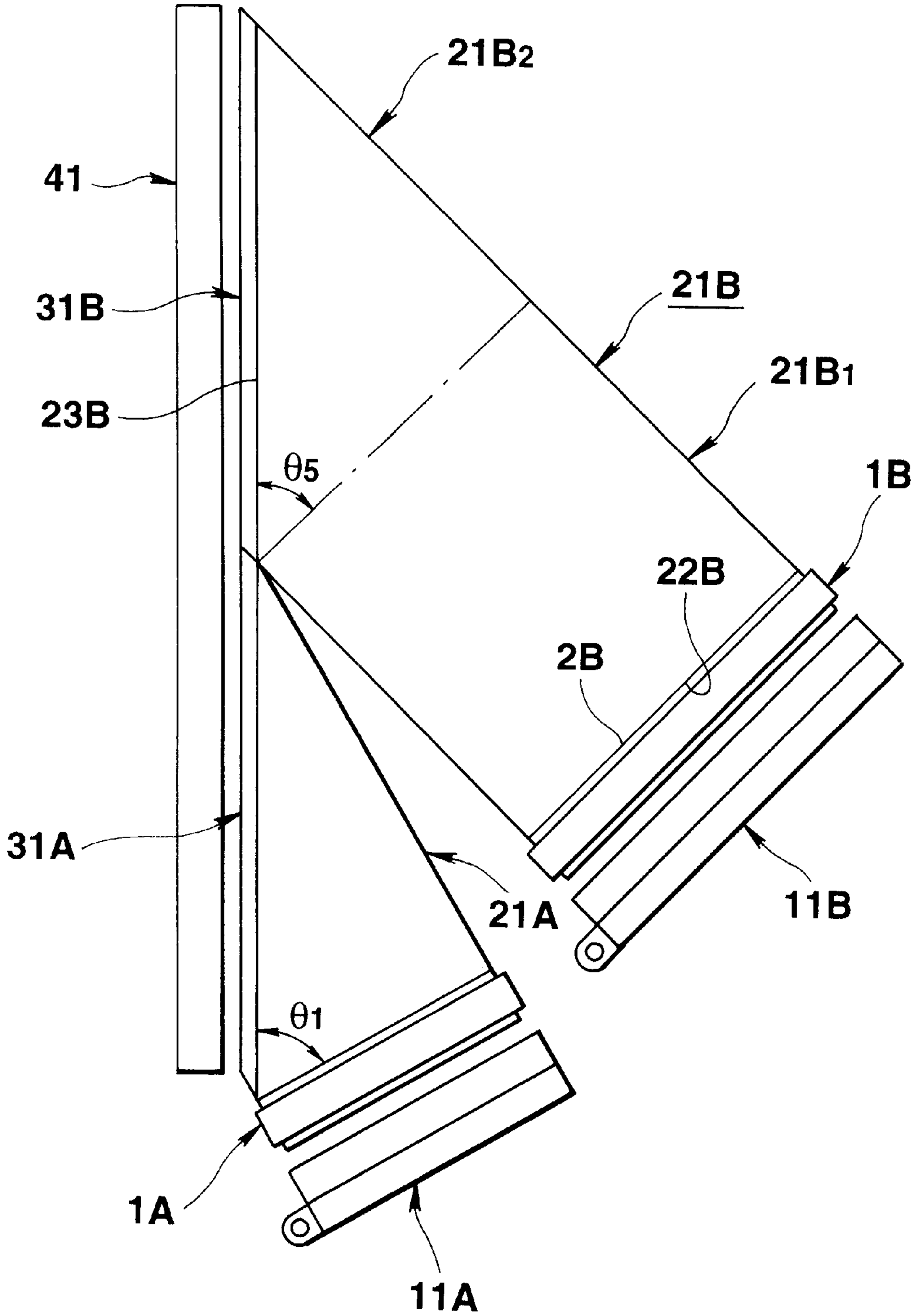
FIG. 16 is a side view of the main part of a display apparatus according to the fourth embodiment of the present invention.

FIG. 16 is a side view of the main part of a display apparatus according to the fourth embodiment of the present invention. In this display apparatus, one enlarged image is displayed on one diffusion plate 41 by two liquid crystal display panels 1A and 1B, i.e., by the first liquid crystal display panel 1A arranged to be inclined with respect to the horizontal plane by 30° and the second liquid crystal display panel 1B arranged at an obliquely upper right portion of the first liquid crystal display panel 1A to be inclined with respect to the horizontal surface by 45°. In this case, the second liquid crystal display panel 1B is inclined with respect to the horizontal plane by 45° in order to obtain a space for this second liquid crystal display panel 1B and a second backlight unit 11B on the lower surface side of the second liquid crystal display panel 1B. The size of the second liquid crystal display panel 1B, including its pixel electrodes 9 in the direction of data lines 8 corresponding to those shown in, e.g., FIG. 2, is $\sqrt{2}$ times the size of the first liquid crystal display panel 1A including its pixel electrodes 9 in the same direction. Accordingly, the second backlight unit 11B is also larger than a first backlight unit 11A by a predetermined amount.

The sizes of the first and second refractors 31A and 31B are almost equal to each other. Accordingly, although a first optical guide 21A has a right-angled triangular side surface, a second optical guide 21B consists of an optical guide portion 21B1 with a square side surface, which has an incident surface 22B of almost the same size as that of an image display surface 2B of the second liquid crystal display panel 1B, and an optical guide portion 21B2 with a right-angled triangular side surface, which has an exit surface 23B of almost the same size as that of the second refractor 31B. The upper end portion of the first refractor 31A and the lower end portion of the second refractor 31B are in tight contact with each other. This aims at preventing the gap between the two liquid crystal display panels 1A and 1B and the non-display regions of the respective liquid crystal display panels 1A and 1B from being seen on the diffusion plate 41 that displays image light emerging from the refractors 31A and 31B.

In the embodiment shown in FIG. 16, since an angle $\theta 1$ formed by the incident and exit surfaces of the first optical guide 21A is 60°, the image on the first liquid crystal display panel 1A is enlarged twice in the vertical direction. Meanwhile, since an angle $\theta 5$ formed by the incident and exit surfaces of the second optical guide 21B is 45°, the image on the second liquid crystal display panel 1B is enlarged $\sqrt{2}$ times in the vertical direction. As described above, the size of the second liquid crystal display panel 1B including its pixel electrodes 9 in the direction of the data lines 8 shown in, e.g., FIG. 2, is $\sqrt{2}$ times that of the first liquid crystal display panel 1A including its pixel electrodes 9 in the same direction. Therefore, an image obtained by enlarging the image on the second liquid crystal display panel 1B $\sqrt{2}$ times in the vertical direction has the same size as that of the image obtained by enlarging the image on the first liquid crystal display panel 1A twice in the vertical direction. As a result, one enlarged image is displayed on one diffusion plate 41 by the first and second liquid crystal display panels 1A and 1B. As shown in the fifth embodiment shown in FIG. 17, first and second liquid crystal display panels 1A and 1B and the like may be arranged symmetrically in the vertical direction.

Figure 17:
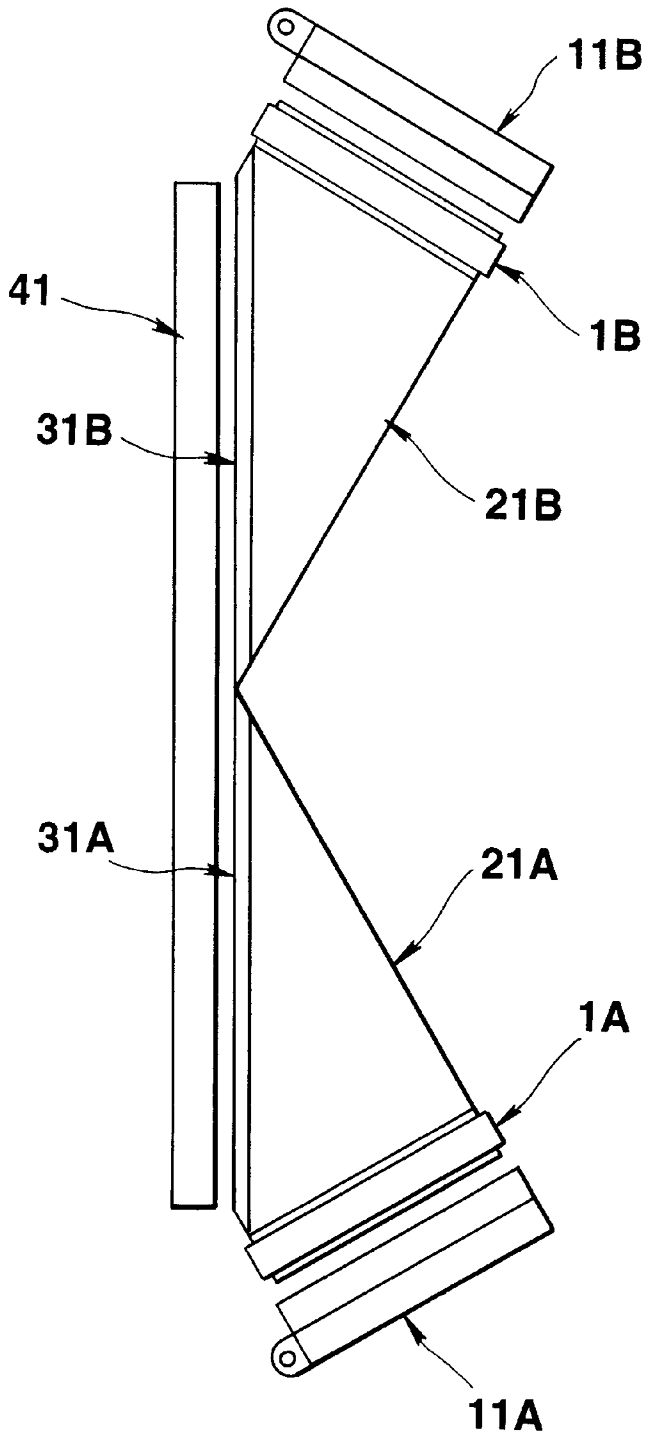
FIG. 17 is a side view of the main part of a display apparatus according to the fifth embodiment of the present invention.
Figure 18:
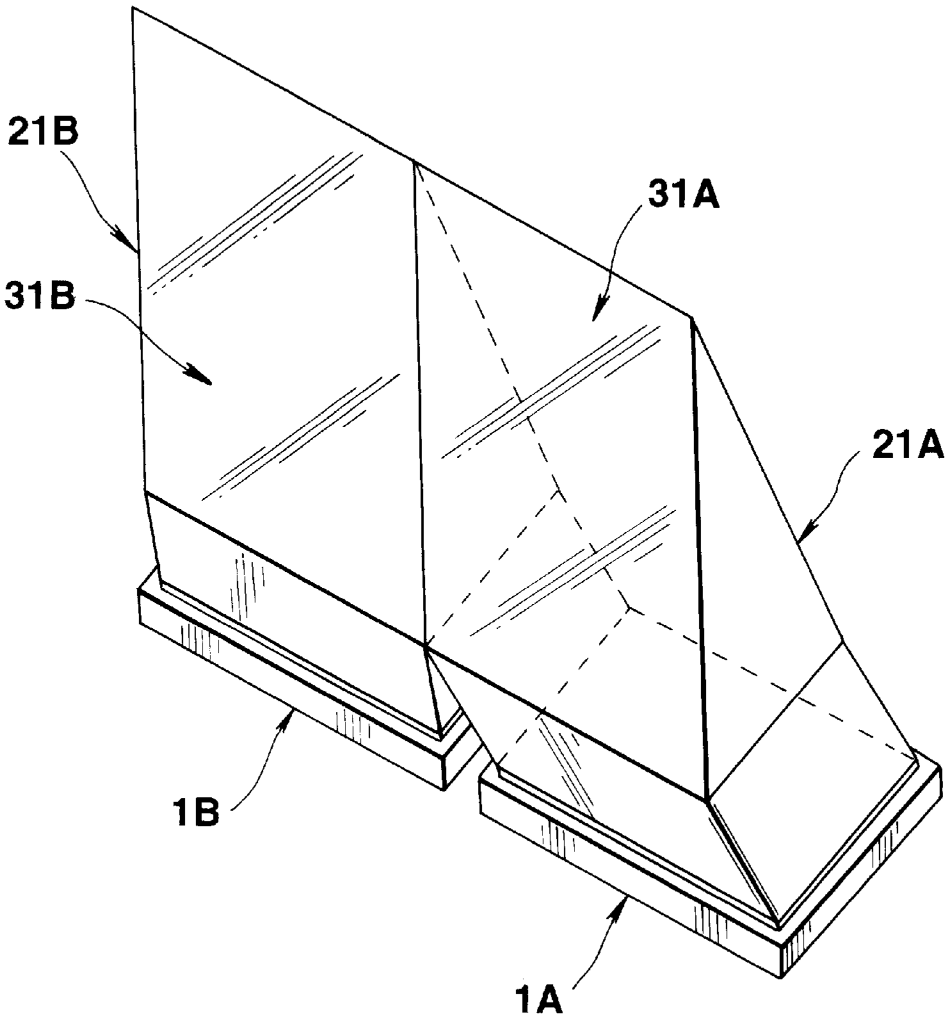
FIG. 18 is a perspective view of the main part of a display apparatus according to the sixth embodiment of the present invention.

FIG. 18 is a perspective view of the main part of a display apparatus according to the sixth embodiment of the present invention. In this display apparatus, one enlarged image is displayed on one diffusion plate (not shown) by first and second liquid crystal display panels 1A and 1B that are arranged symmetrically in the horizontal direction to be inclined with respect to the horizontal surface by 30°. In this case, in order to obtain a space for arranging the first and second liquid crystal display panels 1A and 1B and first and second backlight units (not shown), the lower portions of first and second optical guides 21A and 21B are inclined in a direction to separate from each other. The first and second first optical guides 21A and 21B are in tight contact with each other, and first and second refractors 31A and 31B are also in tight contact with each other, so that the gap between the two liquid crystal display panels 1A and 1B and the like may not be seen on the diffusion plate. FIG. 17 is a side view. If FIG. 17 is a plan view, the first and second liquid crystal display panels 1A and 1B may be arranged symmetrically while they are vertical. In order to obtain a larger image surface, for example, the first and second liquid crystal display panels 1A and 1B and the like shown in the side surface of FIG. 17 may be arranged symmetrically in the horizontal direction. If FIG. 17 is a plan view, the first and second liquid crystal display panels 1A and 1B and the like may be arranged symmetrically in the vertical direction.

Figure 19:
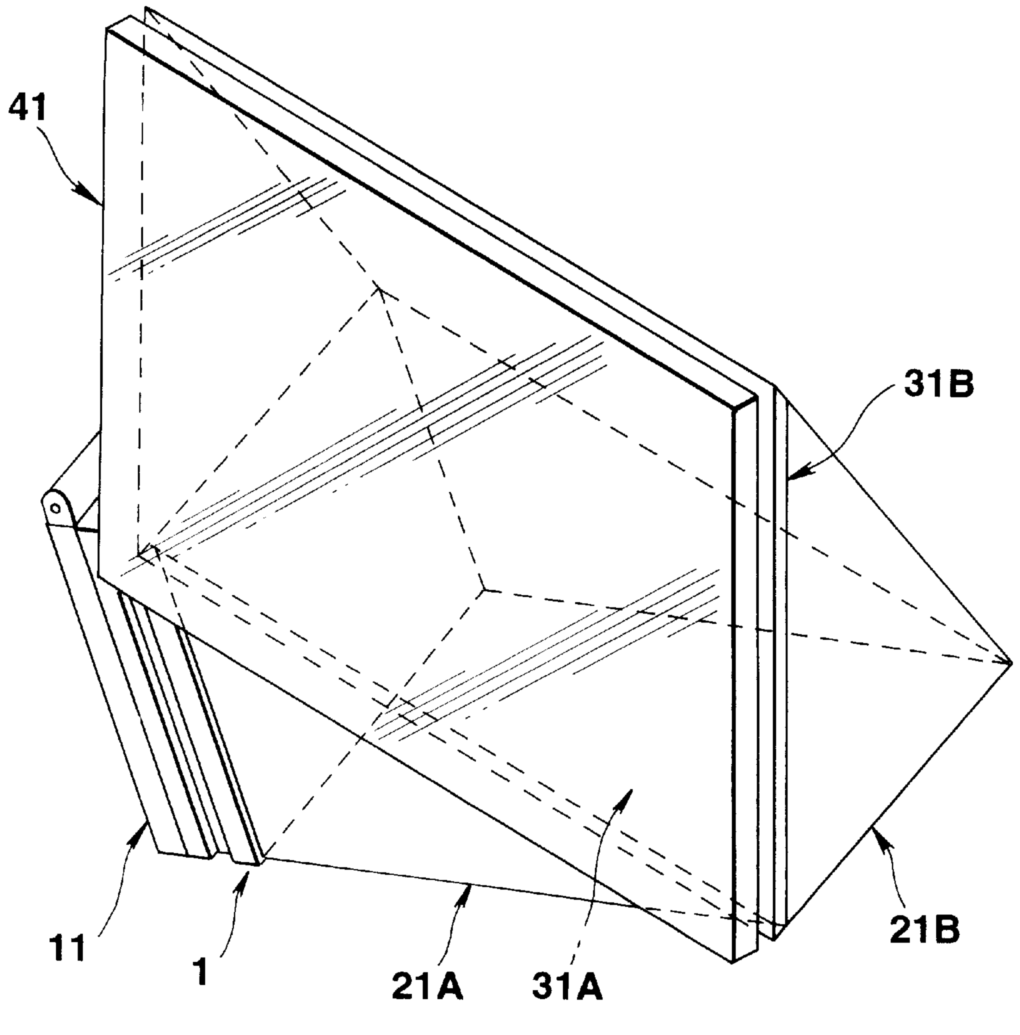
FIG. 19 is a perspective view of the main part of a display apparatus according to the seventh embodiment of the present invention.

FIG. 19 is a perspective view showing the main part of a display apparatus according to the seventh embodiment of the present invention. In this display apparatus, a backlight unit 11 is arranged on the image non-display surface side of a liquid crystal display panel 1, a first optical guide 21A is arranged on the image display surface side of the liquid crystal display panel 1, a first refractor 31A is arranged on the exit surface side of the first optical guide 21A, a second optical guide 21B is arranged on the exit surface side of the first refractor 31A, a second refractor 31B is arranged on the exit surface side of the second optical guide 21B, and a diffusion plate 41 is arranged on the exit surface side of the second refractor 31B. The diffusion plate 41 is vertical. In this case, image light emerging from the image display surface of the liquid crystal display panel 1 is enlarged in one predetermined direction by the first optical guide 21A and the first refractor 31A. The enlarged image light is perpendicularly incident on the incident surface of the second optical guide 21B. The incident image light is enlarged in a direction perpendicular to the above-described predetermined direction by the second optical guide 21B and the second refractor 31B. The enlarged image light emerges from the exit surface of the second refractor 31B in a direction perpendicular to this exit surface. The image light from the exit surface of the second refractor 31B is diffused by the diffusion plate 41.

Figure 20:
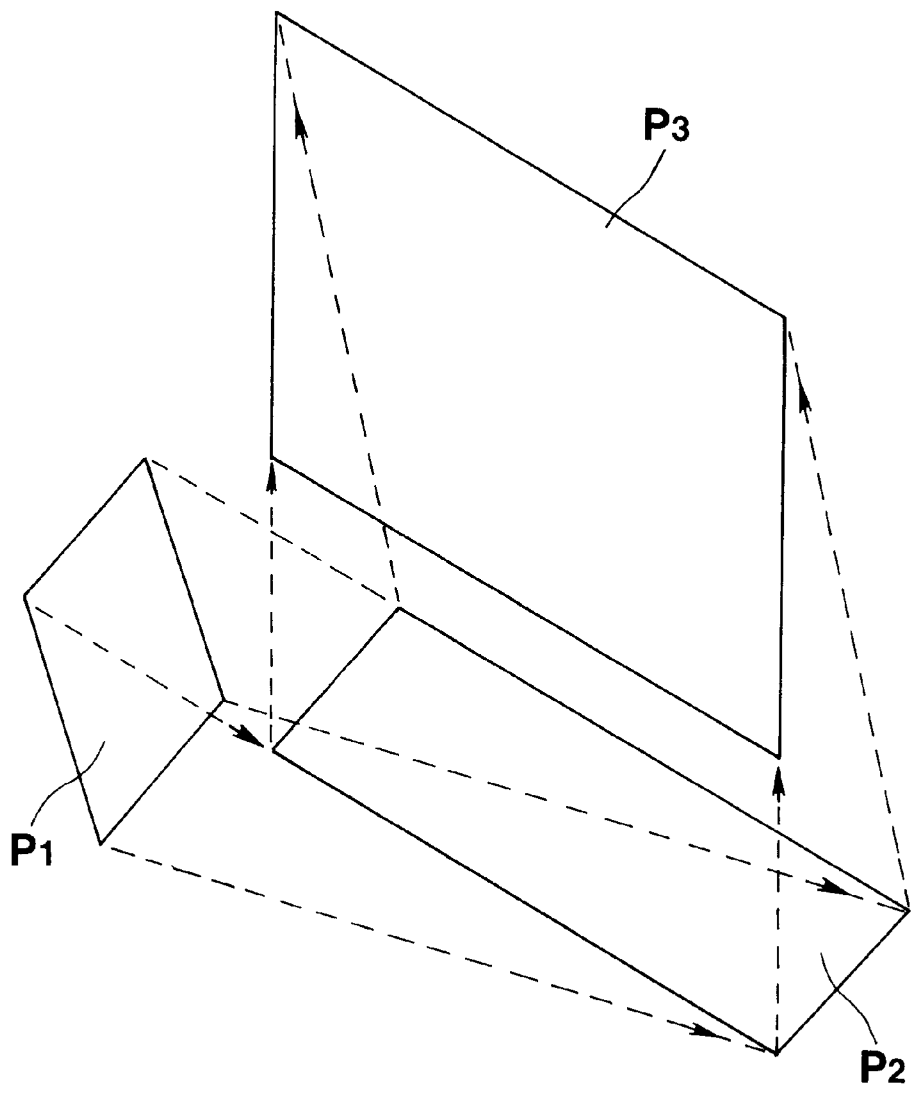
FIG. 20 is a view for explaining how an image is enlarged in the display apparatus shown in FIG. 19.

In this manner, in the seventh embodiment, since image light coming from the image display surface of the liquid crystal display panel 1 is enlarged in one predetermined direction and another direction perpendicular to this predetermined direction, an ordinary liquid crystal display panel can be used as the liquid crystal display panel 1. As shown in FIG. 20, when an ordinary liquid crystal display panel is used as the liquid crystal display panel 1, an ordinary image P1 emerging from the image display surface of the liquid crystal display panel 1 is enlarged 2 to 10 times in the predetermined direction to become an image P2. This image P2 is enlarged 2 to 10 times similarly in another direction perpendicular to the above-described predetermined direction to become an image P3. Therefore, the obtained image P3 is a 2× to 10× image of the first ordinary image P1.

Figure 21:
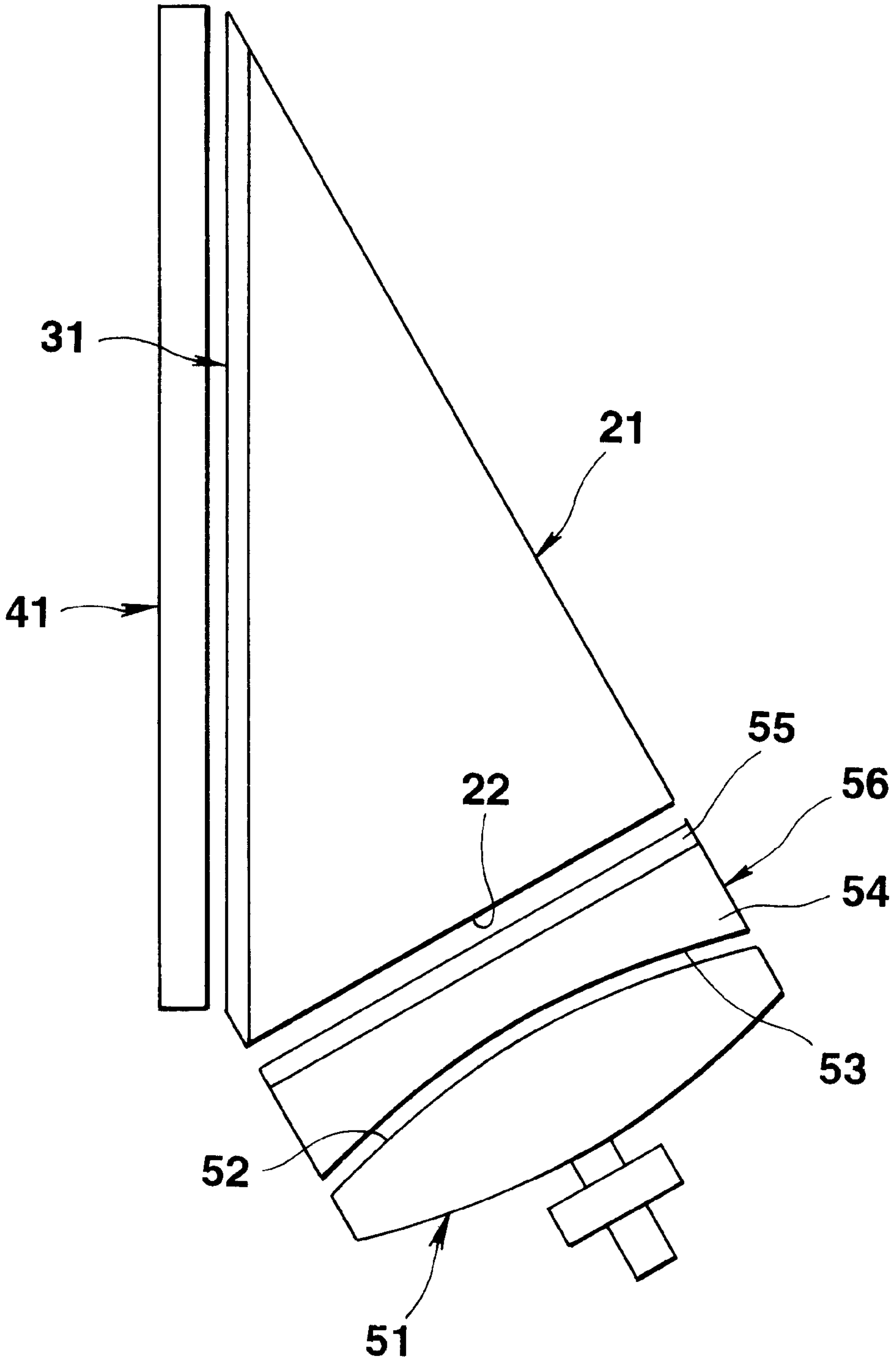
FIG. 21 is a side view of the main part of a display apparatus according to the eighth embodiment of the present invention.
Figure 22:
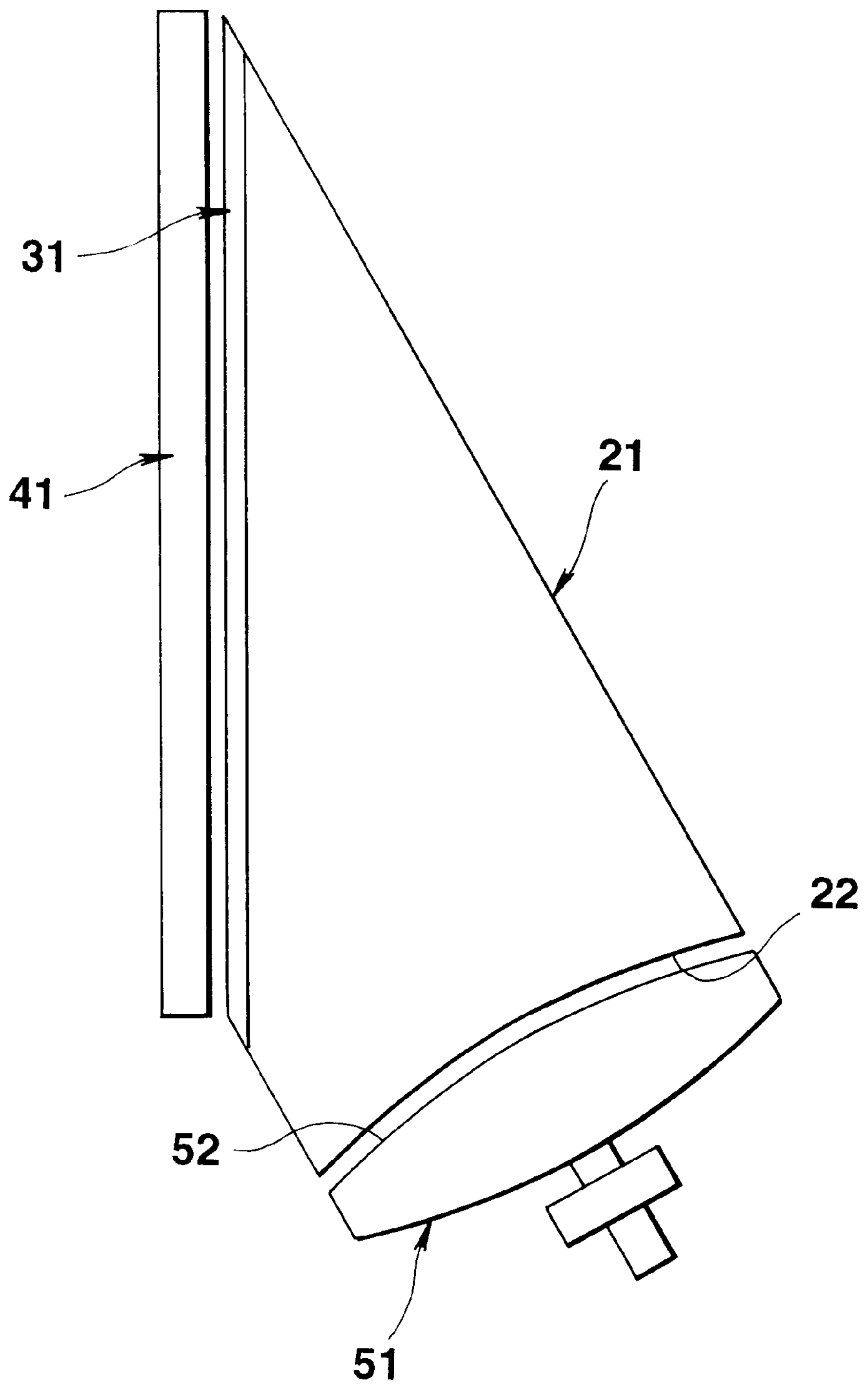
FIG. 22 is a side view of the main part of a display apparatus according to the ninth embodiment of the present invention.

FIG. 21 is a side view showing the main part of a display apparatus according to the eighth embodiment of the present invention. In this display apparatus, a CRT display 51 is used as a display. In this case, since an image display surface 52 of the CRT display 51 is an arcuated convex surface, a collimating optical guide 56 is arranged above the image display surface 52 in order to collimate the image light emerging from the image display surface 52 into parallel light and sending the parallel image light to be perpendicularly incident on an incident surface 22 of an optical guide 21. The collimating optical guide 56 is obtained by densely forming a large number of small convex lens portions 55 on a transparent member 54. The transparent member 54 has, on its one surface, an incident surface 53 comprising a concave surface arcuated in accordance with the image display surface 52. The small convex lens portions 55 are formed on the other surface of the transparent member 54. The collimating optical guide 56 may not be used, but an arrangement of the ninth embodiment shown in, e.g., FIG. 22, may be employed. More specifically, an incident surface 22 of an optical guide 21 may be a concave surface which is arcuated in accordance with an image display surface 52 of a CRT display 51.

Figure 23:
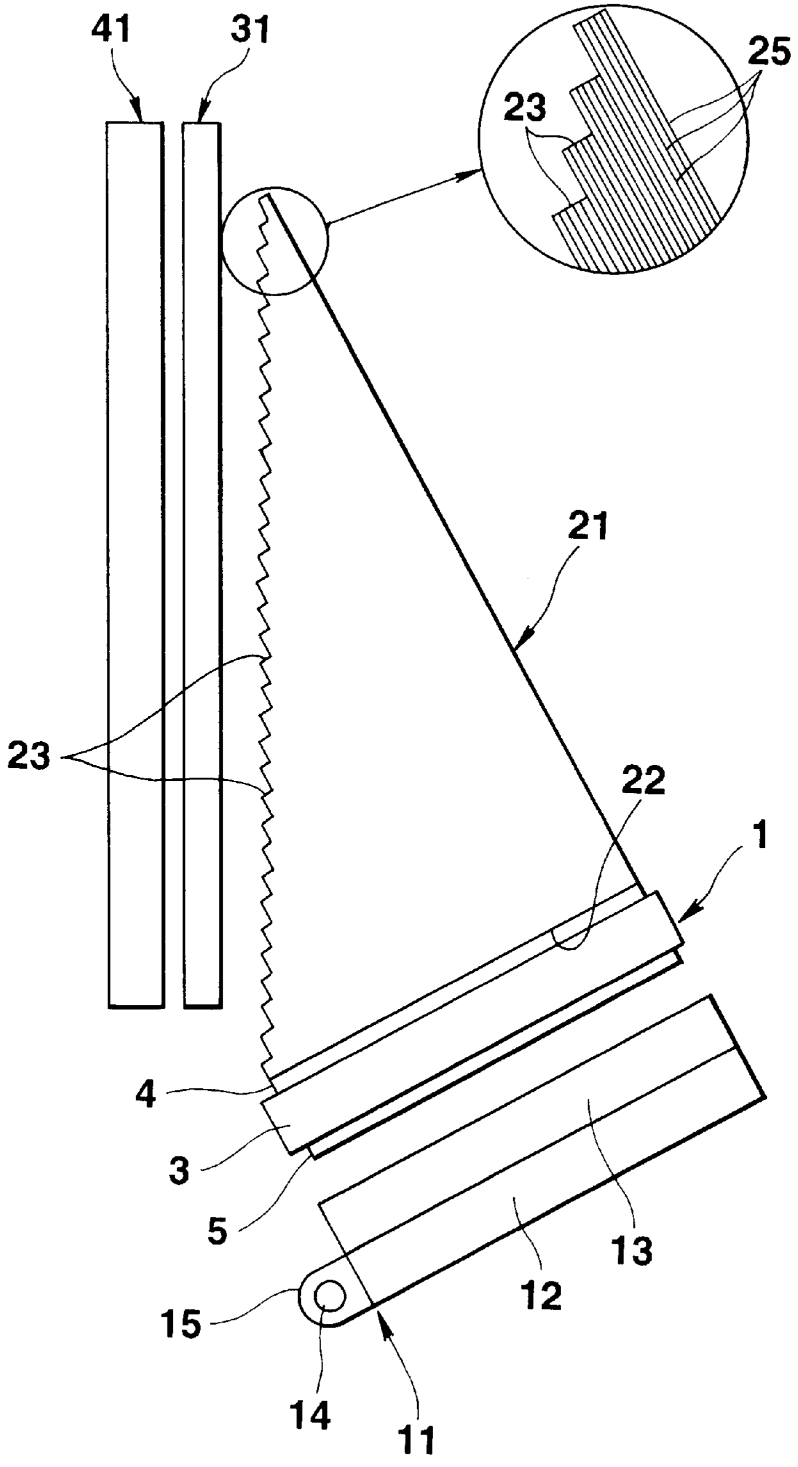
FIG. 23 is a side view of the main part of a display apparatus according to the tenth embodiment of the present invention, the part of which is enclosed in a circular line is enlargely shown.
Figure 24:
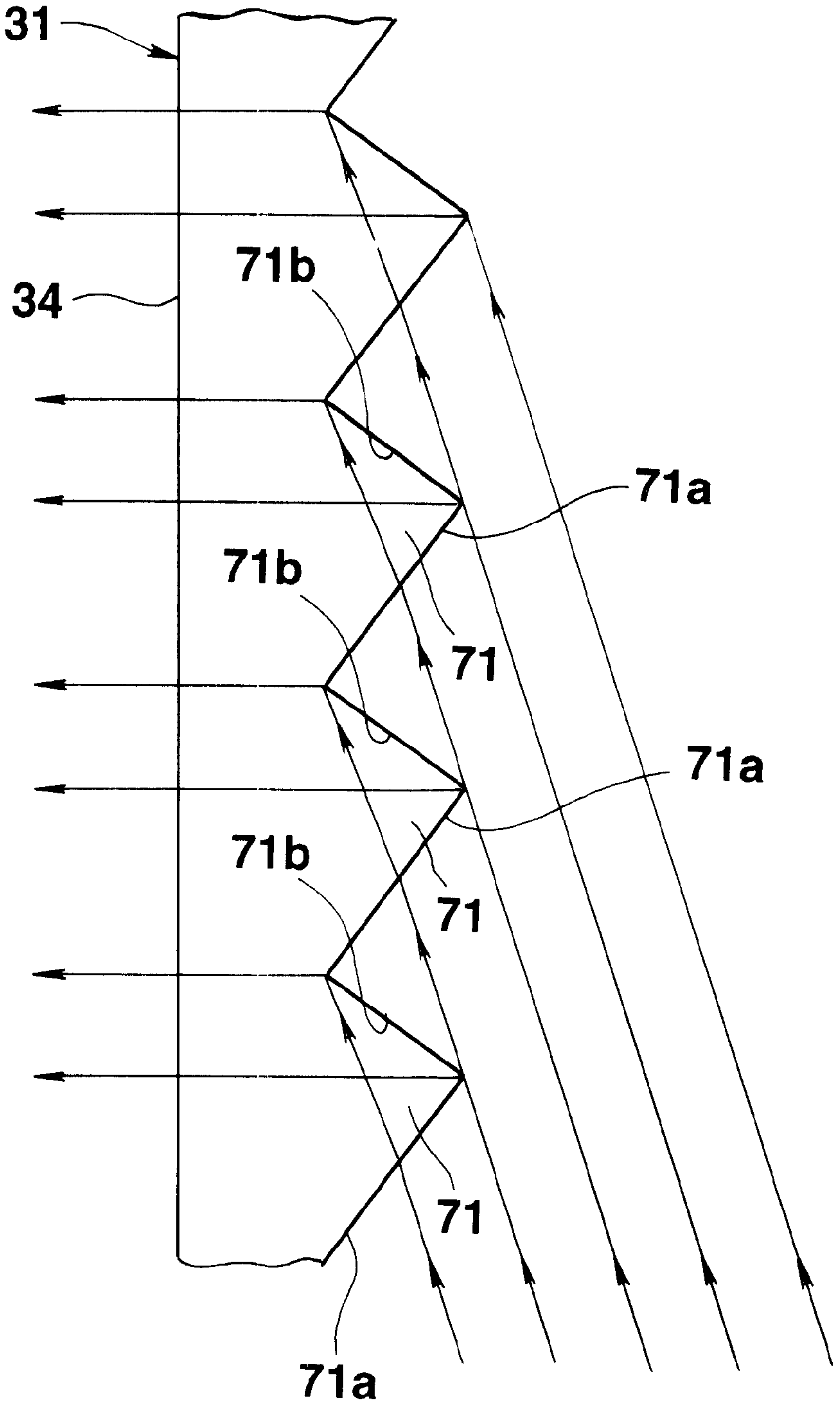
FIG. 24 is a view for explaining how an image is enlarged in the display apparatus shown in FIG. 23.
Figure 25:
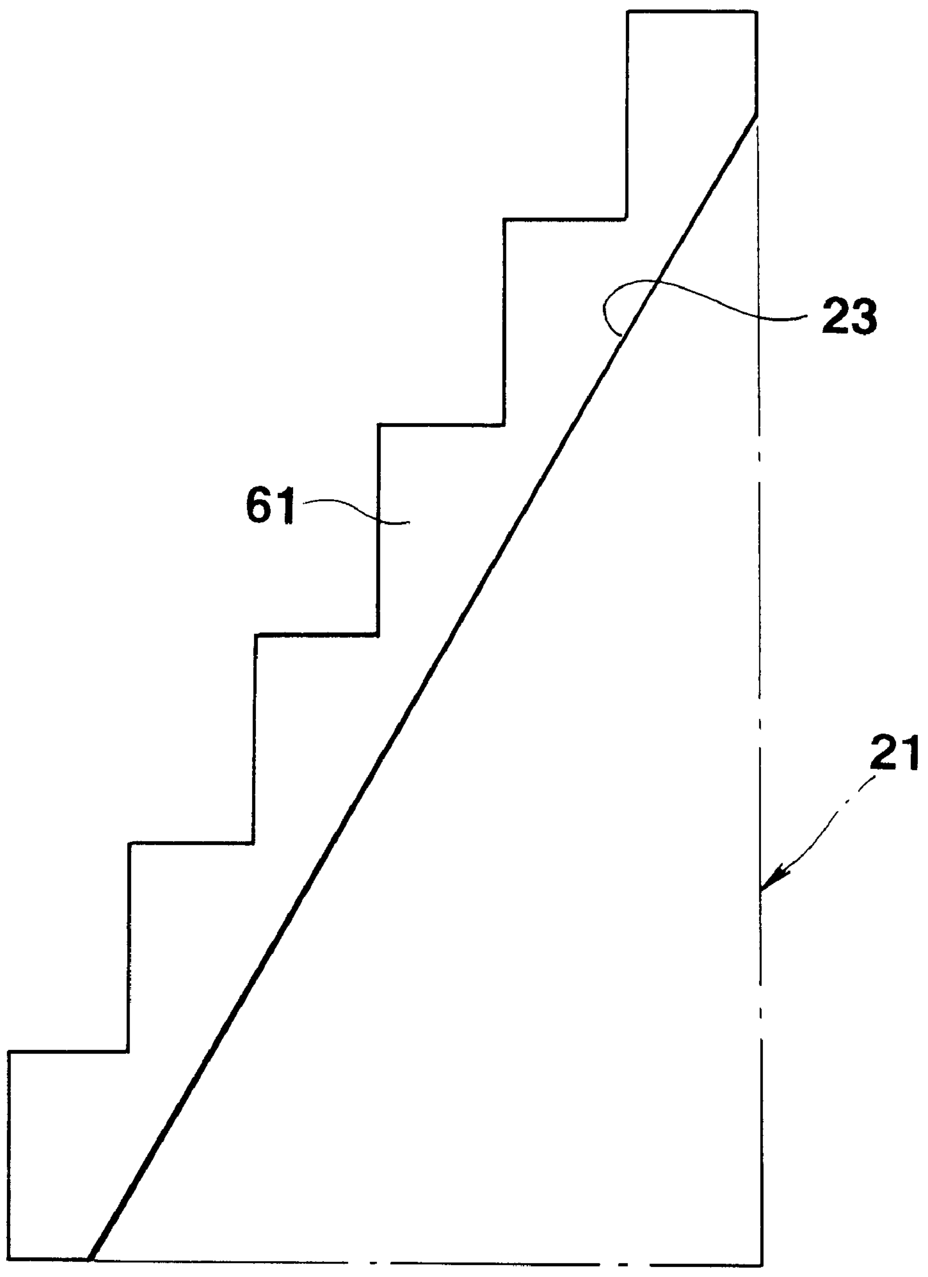
FIG. 25 is a side view of the main part of a display apparatus according to the eleventh embodiment of the present invention.

FIG. 23 includes a side view of the main part of a display apparatus according to the tenth embodiment of the present invention, and an enlarged sectional view of its part. In this display apparatus, exit surfaces 23 of an optical guide 21 are stepwise inclined surfaces. The substantial exit surfaces 23 are parallel to an incident surface 22 of the optical guide 21. A refractor 31 is inserted between the exit surfaces 23 and a diffusion plate 41. According to a method of forming the optical guide 21 of this case, the optical guide 21 identical to that shown in FIG. 1 is formed, and thereafter the exit surface 23 identical to that shown in FIG. 1 is cut stepwise. The pitch of the step portion is preferably as small as possible. For example, according to the above forming method using cutting, if the width of substantial exit surface 23 is about 0.05 m to 0.5 mm, several to several ten cores 25 are arranged within this width. A refractor 31 of this case can be the one as shown in FIG. 7 or 12, or the one as shown in FIG. 24. In a refractor 31 shown in FIG. 24, transversely elongated prism portions 71 are formed on the entire portion of one surface of a resin film made of, e.g., polycarbonate, at a very small arrangement pitch of about 50 $\mu$m. In this case, as indicated by arrows in FIG. 24, image light propagating straight in cores 25 of an optical guide 21 along the central axes of the cores 25 is incident on incident surfaces 71*a* comprising the lower surfaces of the prism portions 71 of the refractor 31, and is reflected (refracted) by reflecting surfaces 71*b* comprising the upper surfaces of the prism portions 71 to become image light perpendicular to an exit surface 34 of the refractor 31, so that it is enlarged in the direction of arrangement of the prism portions 71. According to another method of forming the optical guide 21 of this case, as shown in the eleventh embodiment shown in FIG. 25, a sheet member 61, one surface of which is a flat surface and the other surface of which is stepped, may be made of the same material as that of cores 25 of an optical guide 21, or of a material having a refractive index close to that of the cores 25, and the flat surface of the sheet member 61 may be adhered to an exit surface 23 of the optical guide 21 with an adhesive (not shown) made of an acrylic resin.

In the above embodiments, plastic optical fibers are used. However, glass optical fibers obtained by coating cores made of high-refractive index glass with cladding layers made of low-refractive index glass may be used. Also, graded optical fibers may be used in place of the stepped optical fibers as described above. In the above embodiments, a liquid crystal display panel or a CRT display is used as the display. However, an EL display, an LED display, a plasma display, or the like may be used instead.

As has been described above, according to the present invention, since the optical guide has a large number of linear optical guide lines that are arranged densely, when assembling the apparatus, it suffices to incorporate this optical guide, thus facilitating the assembling operation. Since the exit surface of the optical guide is an inclined surface which is inclined with respect to the incident surface, the shape of the side surface of the optical guide can be formed as, e.g., a right-angled triangle. Since the incident surface of the optical guide need only be arranged on the image display surface side of the display, when the exit surface of the optical guide is vertical, the depth of the optical guide can be set to almost equal to the depth of the display, leading to a reduction in size of the entire apparatus.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

I claim:

1. An optical image guide system comprising:

a display having an image display surface;

an optical guide formed of a large number of optical fibers each of which has a core covered with a cladding, said optical guide having an incident surface disposed in parallel to the image display surface of the display and an inclined face inclined with respect to the incident surface, said optical fibers extending vertically with respect to the incident surface, and said inclined face having a plurality of exit surfaces which are arranged stepwise and which are parallel to the incident surface;

an optical refractor comprising a plate-like refractor body in which a plurality of refracting layers are formed, each of said refracting layers being arranged to correspond to one of said exit surfaces, and said optical refractor being arranged in parallel to the inclined face of the optical guide for refracting light emerging from each of the exit surfaces to be substantially perpendicular to the inclined face; and a screen for displaying light emerging from the optical refractor so as to be visually observable.

2. An optical image guide system according to claim 1, wherein the optical guide comprises a body having the incident surface and the inclined face, and a sheet having a flat surface facing the inclined face and the exit surfaces arranged stepwise along the inclined face.

3. An optical image guide system according to claim 1, wherein each of the refracting layers comprises a first refracting surface for refracting light emerging from a corresponding one of the exit surfaces to be substantially perpendicular to the inclined face of the optical guide, and a second refracting surface for refracting the light towards the first refracting surface of a neighboring one of the refracting layers.

4. An optical image guide system according to claim 1, wherein the inclined face of the optical guide is inclined with respect to the incident surface of the optical guide by not less than 45°.

5. An optical image guide system according to claim 1, wherein the optical refractor comprises a prism having an inclined surface to refract light emerging from the optical guide.

6. An optical image guide system according to claim 1, wherein the optical refractor is in contact with the inclined face of the optical guide.

7. An optical image guide system according to claim 1, wherein the optical refractor comprises a material having a similar refractive index to that of a material of the cores of the optical fibers of which the optical guide is formed.

8. An optical image guide system according to claim 1, wherein the refracting layers of the optical refractor comprise air.

9. An optical image guide system comprising:

a display having an image display surface;

an optical guide formed of a large number of optical fibers each of which has a core covered with a cladding, said optical guide having an incident surface facing the image display surface of the display and an inclined face inclined with respect to the incident surface, and said inclined face having a plurality of exit surfaces which are arranged stepwise and which are parallel to the incident surface;

an optical refractor having a plurality of refracting layers each of which corresponds to one of said exit surfaces, said optical refractor being arranged in parallel to the inclined face of the optical guide for refracting light emerging from each of the exit surfaces to be substantially perpendicular to the inclined face; and a screen for displaying light emerging from the optical refractor so as to be visually observable;

wherein the optical refractor comprises a support member, and wherein the refracting layers are included within the support member; and wherein each of the refracting layers comprises a first refracting surface for refracting light emerging from a corresponding one of the exit surfaces to be substantially perpendicular to the inclined face of the optical guide, and a second refracting surface for refracting the light towards the first refracting surface of a neighboring one of the refracting layers.

* * * * *